United States Patent
Vardharajan

(10) Patent No.: US 10,974,729 B2
(45) Date of Patent: Apr. 13, 2021

(54) APPLICATION AND PORTABILITY OF VEHICLE FUNCTIONALITY PROFILES

(71) Applicant: AT&T Intellectual Property I, L.P., Atlanta, GA (US)

(72) Inventor: Satya B. Vardharajan, San Diego, CA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 319 days.

(21) Appl. No.: 16/108,032

(22) Filed: Aug. 21, 2018

(65) Prior Publication Data

US 2020/0062269 A1  Feb. 27, 2020

(51) Int. Cl.
*B60W 50/00* (2006.01)
*G07C 5/00* (2006.01)

(52) U.S. Cl.
CPC ......... *B60W 50/0098* (2013.01); *G07C 5/008* (2013.01); *B60W 2050/0079* (2013.01); *B60W 2540/043* (2020.02)

(58) Field of Classification Search
CPC ....... B60W 50/0098; B60W 2540/043; B60W 2050/0079; G07C 5/008
See application file for complete search history.

(56) References Cited

U.S. PATENT DOCUMENTS

| | | |
|---|---|---|
| 4,707,788 A | 11/1987 | Tashiro et al. |
| 5,091,856 A | 2/1992 | Hasegawa et al. |
| 5,410,477 A | 4/1995 | Ishii et al. |

(Continued)

FOREIGN PATENT DOCUMENTS

| | | |
|---|---|---|
| FR | 2845195 | 4/2004 |
| GB | 2476470 | 12/2011 |

(Continued)

OTHER PUBLICATIONS

BMW i8-Model Highlights—BMW North America, "A Plug-In Hybrid that Sparks Revolution in Every Ignition," [retrieved from internet at http://www.bmwusa.com/standard/content/Vehicles/2015/i8/bmwi8/modelhighlights/default.aspx on Jan. 28, 2015] (2 pages).

(Continued)

*Primary Examiner* — Adam R Mott
(74) *Attorney, Agent, or Firm* — Amin, Turocy & Watson, LLP

(57) ABSTRACT

Example methods, apparatus, systems, and articles of manufacture (e.g., physical storage media) to facilitate application and portability of vehicle functionality profiles are disclosed. An example method may include receiving data indicative of an identity of a user. The method may include determining, based on the identity, that the user has vehicle profile setting privileges for the vehicle. The method may include receiving a vehicle profile associated with the user to apply to the vehicle to adjust at least one operating parameter of the vehicle. The vehicle profile is one of a plurality of predetermined vehicle profiles selectable by the user. The method may include determining whether the first vehicle profile can be applied to the vehicle; and, in response to determining the first vehicle profile can be applied to the vehicle, applying the first vehicle profile to the vehicle that causes an operation of the vehicle.

20 Claims, 7 Drawing Sheets

(56) References Cited

U.S. PATENT DOCUMENTS

| | | | |
|---|---|---|---|
| 6,205,374 | B1 | 3/2001 | Kljima et al. |
| 6,356,185 | B1 | 3/2002 | Plugge et al. |
| 6,430,488 | B1 | 8/2002 | Goldman et al. |
| 6,751,534 | B2 | 6/2004 | Robichaux et al. |
| 7,978,056 | B2 | 7/2011 | Mercurio et al. |
| 8,126,450 | B2 | 2/2012 | Howarter et al. |
| 8,224,313 | B2 | 7/2012 | Howarter et al. |
| 8,326,259 | B2 | 12/2012 | Gautama et al. |
| 8,417,436 | B2 | 4/2013 | Russell |
| 8,538,408 | B2 | 9/2013 | Howarter et al. |
| 8,589,049 | B2 | 11/2013 | Craig |
| 8,635,018 | B2 | 1/2014 | Chia et al. |
| 8,761,998 | B2 | 6/2014 | Chen et al. |
| 8,825,222 | B2 | 9/2014 | Namburu et al. |
| 8,874,653 | B2 | 10/2014 | Chang |
| 8,977,408 | B1 | 3/2015 | Cazanas et al. |
| 8,989,955 | B1 | 3/2015 | Hart |
| 9,171,268 | B1 * | 10/2015 | Penilla .................. G06Q 30/00 |
| 9,189,897 | B1 | 11/2015 | Stenneth |
| 9,401,845 | B2 | 7/2016 | Cazanas et al. |
| 9,540,015 | B2 | 1/2017 | Stahulak et al. |
| 9,643,619 | B2 | 5/2017 | Sinaguinan |
| 9,694,770 | B2 | 7/2017 | Tobin |
| 9,908,508 | B2 | 3/2018 | Phelan |
| 9,959,780 | B2 | 5/2018 | Fields et al. |
| 10,262,535 | B2 | 4/2019 | Konig et al. |
| 2002/0168071 | A1 | 11/2002 | Daly |
| 2004/0095237 | A1 | 5/2004 | Chen et al. |
| 2006/0066149 | A1 | 3/2006 | Holloway et al. |
| 2007/0021885 | A1 | 1/2007 | Soehren |
| 2010/0087987 | A1 | 4/2010 | Huang et al. |
| 2010/0274410 | A1 | 10/2010 | Tsien et al. |
| 2011/0040707 | A1 | 2/2011 | Theisen et al. |
| 2011/0254655 | A1 | 10/2011 | Maalouf et al. |
| 2011/0307130 | A1 | 12/2011 | Gow et al. |
| 2013/0328699 | A1 | 12/2013 | Schramm et al. |
| 2014/0277835 | A1 | 9/2014 | Filev et al. |
| 2014/0297115 | A1 | 10/2014 | Kang et al. |
| 2014/0309806 | A1 | 10/2014 | Ricci |
| 2015/0016627 | A1 | 1/2015 | Barlow et al. |
| 2015/0088337 | A1 | 3/2015 | Toohy et al. |
| 2015/0307081 | A1 | 10/2015 | West et al. |
| 2016/0318467 | A1 | 11/2016 | Ricci |
| 2016/0325754 | A1 | 11/2016 | Stahulak et al. |
| 2016/0335814 | A1 | 11/2016 | Tamari et al. |
| 2017/0050645 | A1 | 2/2017 | Porembski et al. |
| 2017/0129500 | A1 | 5/2017 | Hipp |
| 2017/0197631 | A1 | 7/2017 | Sinaguinan |
| 2018/0041583 | A1 | 2/2018 | Fan et al. |
| 2018/0204399 | A1 * | 7/2018 | Newman ............... H04W 12/08 |

FOREIGN PATENT DOCUMENTS

| | | |
|---|---|---|
| WO | WO 2012/016722 | 2/2012 |
| WO | WO 2014/120935 | 8/2014 |

OTHER PUBLICATIONS

Chevrolet, "The 2015 Volt, Electricity Travels: Ready to Test the Limits of How Far Electric Cars Can Take You?" retrieved Jan. 29, 2015 (7 pages).

Autotrader.com, "Infiniti Q50 Remembers Its Driver," [retrieved from internet at http://www.autotrader.com/research/article/car-news/212281/infiniti-q50-remembers-its-driver.jsp on Jan. 27, 2015] (2 pages).

Kia K 900, "2015 Kia K900 4dr Sdn Premium," [retrieved from internet at http://www.caranddriver.com/kia on Jan. 29, 2015] (7 pages).

Mitsubishi Motors Corporation, "Automobile Technology: Technology Library, The Plug-In Hybrid EV System," retrieved Jan. 29, 2015 (5 pages).

Subaru, "It's What Makes a Subaru, A Subaru: Subaru Intelligent Drive (SI-Drive)," [retrieved from internet at http://drive2.subaru.com/Summer07_what makes.htm on Jan. 27, 2015] (3 pages).

Volkswagen, "Driver Profile Selection," 2015 (2 pages).

Algaze, Ben, "The connected car: much more than a smartphone on wheels", [retrieved from internet at https://www.extremetech.com/extreme/220793-the-connected-car-much-more-than-a-smartphone-on-wheels on Jun. 1, 2018] (9 pages).

* cited by examiner

APPLICATION AND PORTABILITY OF VEHICLE FUNCTIONALITY PROFILES

FIELD OF THE DISCLOSURE

This disclosure relates generally to vehicle operation, more particularly, to application and portability of vehicle functionality profiles.

BACKGROUND

Vehicles may be controlled by networks of embedded systems, called electronic control units (ECUs), which control different aspects of vehicle performance and functionality. In some instances, an ECU may control an individual system or functionality of a vehicle. That is, the ECU may control and/or adjust components of the system with which the ECU is associated according to given operating parameters (e.g., maximum horsepower, gear shifting ratio, spark plug timing, air intake valve angle, fuel injection quantity, air/fuel ratio, etc.). For example, one or more ECUs may control engine operation as well as entertainment, speed control, power train, navigation, transmission, suspension, and braking systems. In some cases, decentralized control of a vehicle may be facilitated by using a control area network (CAN) bus'standard that allows ECUs to communicate with one another without the need for a host computer (e.g., head unit). Operating parameters for the ECUs may be set and adjusted based on manufacturer's settings and/or user selection for example. In the various operating scenarios/applications, setting and/or adjusting of operating parameters applied to a vehicle may be facilitated through communication between the vehicle and other devices.

SUMMARY

Using various embodiments, application and portability of vehicle functionality profiles may allow users to set a feel and/or performance of vehicles. The various embodiments may be used for terrestrial vehicles (e.g., cars), naval vehicles, aerial vehicles, or generally any vehicle for which vehicle functionality profiles may be defined and applied (e.g., to enhance user experience and/or, vehicle performance). The vehicles may be manned vehicles (e.g., including self-driving vehicles), unmanned vehicles (e.g., unmanned cars, unmanned aerial vehicles (UAVs)), or varying degrees thereof (e.g., unmanned drive functionality while providing ways to effectuate manual take-over).

Each vehicle functionality profile may be defined by a combination of values set for various operating parameters that control different systems of the vehicle. By way of non-limiting examples, operation parameters may include stroke length, braking force, air intake angle, suspension height, and coolant flow rate. In an embodiment, the vehicle functionality profile may be associated with a make and model of a vehicle. In applying such a vehicle functionality profile to a vehicle, the vehicle may emulate a feel and/or performance of a vehicle of the make and model.

In various aspects, for a given vehicle, a vehicle functionality profile may be selected by a user using a user device (e.g., smartphone, smartwatch) and stored in the user device for convenient retrieval. For example, the user device may have an application (e.g., app) installed that allows the user to select, via the app, the vehicle functionality profile to apply to the vehicle. In another embodiment, the vehicle functionality profile may be stored in the cloud or on a remote server accessible by the user device (e.g., with or without utilizing the app). The user device may transmit the vehicle functionality profile to the vehicle, and the vehicle may apply the vehicle functionality profile to provide the user with a certain feel and/or performance corresponding to the vehicle functionality profile. In some cases, the user may have multiple user devices (e.g., with the appropriate application installed) that may interface with the vehicle. The vehicle may also have an appropriate application installed thereon for interfacing with the user device(s) (e.g., interfacing with the appropriate application installed on the user device(s)). In some cases, the user may associate the same vehicle functionality profile or different vehicle functionality profiles to different vehicles associated with the user.

In an embodiment, a vehicle may apply a vehicle functionality profile provided by a user that has vehicle profile setting privileges. In some cases, a user having vehicle profile setting privileges may transfer the vehicle profile setting privileges to another user (e.g., temporarily, permanently, and/or conditionally). In an aspect, in cases where multiple users may have vehicle profile setting privileges, each of these users may be associated with a priority value such that the vehicle may apply the vehicle functionality profile provided by a current user of the vehicle that has the highest priority value. For example, the vehicle may request a vehicle functionality profile from the user associated with the highest priority value.

By tying the vehicle functionality profile(s) to the user device, the user may readily set the vehicle functionality profile for any given vehicle associated with the user. Such an approach may be more convenient than having the user manually set the vehicle functionality profile to apply to each vehicle on a vehicle-by-vehicle basis, especially in cases where the user is scheduled to use a given vehicle for a short duration (e.g., has a short-term association with the vehicle).

In one or more embodiments, a method to facilitate application and portability of vehicle operations includes receiving, by a first application associated with a vehicle from a second application associated with a user device, data indicative of an identity of a user. The method further includes determining, by the first application based on the identity, that the user has vehicle profile setting privileges for the vehicle. The method further includes receiving, by the first application, a vehicle profile associated with the user to apply to the vehicle to adjust at least one operating parameter of the vehicle. The vehicle profile is one of a plurality of predetermined vehicle profiles selectable by the user. The method further includes determining, by the first application, whether the vehicle profile can be applied to the vehicle; and, in response to determining the vehicle profile can be applied to the vehicle, applying, by the vehicle, the vehicle profile to the vehicle that causes an operation of the vehicle.

In one or more embodiments, a vehicle includes one or more processors. The vehicle further includes a non-transitory machine readable medium comprising instructions stored therein, which when executed by the one or more processors, cause the one or more processors to perform operations. The operations include detecting a user device associated with a user is within a predetermined distance of the vehicle. The operations further include determining that the user has vehicle profile setting privileges for the vehicle based on an identity of the user. The operations further include receiving, from the user device, a vehicle profile to apply to the vehicle to adjust at least one operating parameter of the vehicle, where the vehicle profile is one of a plurality of stored vehicle profiles. The operations further include determining whether the vehicle profile can be applied to the vehicle and, in response to determining the vehicle profile can be applied to the vehicle, applying the vehicle profile to the vehicle that causes an operation of the vehicle.

In one or more embodiments, a tangible or non-transitory machine readable storage medium includes machine readable instructions which, when executed, cause one or more processors of a device to perform operations. The operations include receiving data indicative of an identity of a user. The operations further include determining, based on the identity of the user, a vehicle profile to apply to a vehicle, where the vehicle profile is one of a plurality of predetermined vehicle profiles. The operations further include determining whether the vehicle profile can be applied to the vehicle and, in response to determining the vehicle profile can be applied to the vehicle, applying the vehicle profile to the vehicle that causes an operation of the vehicle.

The scope of the disclosure is defined by the claims, which are incorporated into this section by reference. A more complete understanding of embodiments of the disclosure will be afforded to those skilled in the art, as well as a realization of additional advantages thereof, by a consideration of the following detailed description of one or more embodiments. Reference will be made to the appended sheets of drawings that will first be described briefly.

Figure 1A:
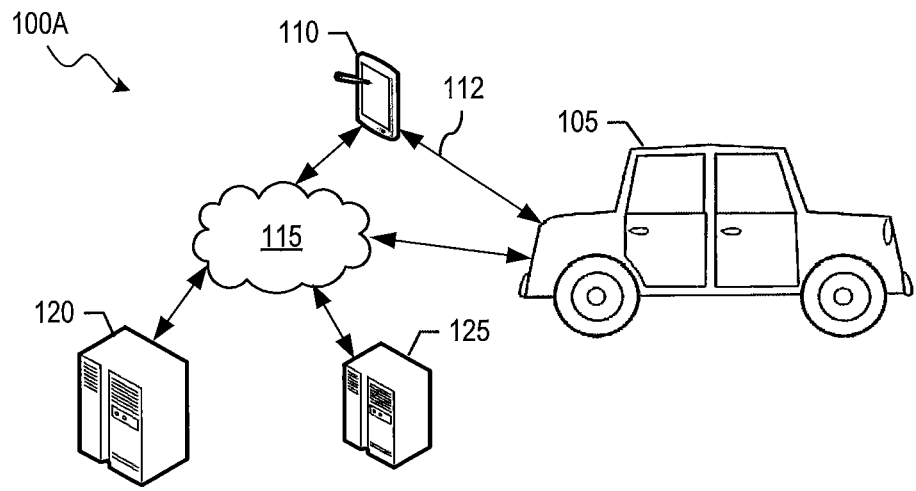
FIGS. 1A through 1D illustrate examples of network environments for facilitating application and portability of vehicle functionality profiles and vehicle ride preferences in accordance with one or more embodiments of the present disclosure.

Embodiments of the present disclosure and their advantages are best understood by referring to the detailed description that follows. It should be appreciated that like reference numerals are used to identify like elements illustrated in one or more of the figures, where showings therein are for purposes of illustrating embodiments of the present disclosure and not for purposes of limiting the same.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

Various techniques are provided for facilitating application and portability of vehicle functionality profiles on vehicles. Each vehicle functionality profile may be defined by a combination of values set for various operating parameters that control different systems of the vehicle (e.g., using corresponding ECUs). For example, values may be set for operating parameters such as stroke length, braking force, air intake angle, suspension height, coolant flow rate, and/or others. For a given vehicle, a vehicle functionality profile applied to the vehicle may determine a feel and/or performance of the vehicle. In an aspect, vehicle functionality profiles may also be referred to as vehicle operation profiles, vehicle operating profiles, vehicle profiles, driving profiles, riding profiles, or driving/riding profiles. In some cases, when a vehicle functionality profile does not include a specific value for one or more operating parameters, the vehicle can set these operating parameters to their corresponding default value (e.g., value set by the manufacturer or vehicle administrator that has been tested for safety). In other cases, the vehicle functionality profiles may include values for all operating parameters.

Vehicles may include terrestrial vehicles (e.g., cars), naval vehicles, aerial vehicles, or generally any vehicle for which vehicle functionality profiles may be defined and applied (e.g., to enhance user experience and/or vehicle performance). As one example, a vehicle may have a capacity to hold between zero and eight riders. The vehicles may be manned vehicles, unmanned vehicles (e.g., unmanned cars, UAVs), or varying degrees thereof (e.g., unmanned drive functionality while allowing manual take-over).

In one example, a vehicle may have one or more drivers (e.g., pilot, co-pilot) and one or more passengers. In another example, a vehicle may have only one or more drivers or only one or more passengers. In a further example, a vehicle (e.g., a self-driving vehicle) may have no drivers and one or more passengers who may have no or some control of various aspects of the vehicle's operation, including "driving" of the vehicle. In another example, a vehicle may have no drivers and no passengers. In the example case with no riders (i.e., no drivers and no passengers), the vehicle may be an unmanned vehicle that carries payload (e.g., package, sensor equipment), in which the vehicle functionality profile applied by a user to the unmanned vehicle may primarily be to facilitate payload safety, vehicle safety, vehicle efficiency (e.g., fuel efficiency), and/or timeliness for example. The unmanned vehicle may be utilized to transport the payload from a starting location to a destination location and/or effectuate use of the payload at the starting location, destination location, and/or en route from the starting location to the destination location (e.g., for a surveillance application).

In some embodiments, the vehicle functionality profiles may be stored and managed by a vehicle profile management system. In some aspects, the vehicle profile management system may be provided and maintained by a vehicle original equipment manufacturer (OEM). In some cases, the vehicle OEM may certify that the vehicle functionality profiles are safe to use on a specific version of a hardware platform. For a given vehicle functionality profile, such a hardware platform may be utilized to generate appropriate instructions to allow applying of the vehicle functionality profile to the vehicle to set a feel and/or performance of the vehicle according to the vehicle functionality profile. Vehicle functionality profiles may be developed, provided, and/or managed by the vehicle OEM and/or other parties. A service provider (e.g., vehicle rental provider, ride hailing company, dealership), mobile network operator, and/or another party may access and/or provide access (e.g., for user devices) to the vehicle profile management system. For example, the vehicle profile management system and/or the vehicle functionality profiles may be maintained at least in part by a group of vehicle manufacturers (e.g., a group of car manufacturers). The vehicle profile management system may include a listing of predetermined vehicle functionality profiles selectable by a user (e.g., a vehicle manufacturer, a consumer of a vehicle). In an embodiment, the vehicle profile management system may facilitate and/or otherwise be associated with a vehicle selling, renting, and/or sharing service. A user of such a service may set up an account with this service to buy a vehicle or schedule usage of a vehicle and/or obtain access to at least a subset of the predetermined vehicle functionality profiles.

Vehicle functionality profiles (e.g., sets of operating parameters) that provide a feel and performance of different vehicle makes and/or types may be generated (e.g., defined, developed, and/or tested) by a vehicle manufacturer and/or other party. A vehicle functionality profile may be produced with ECUs assigned with operating parameters that control, among other things, gear shift timing, engine (e.g., engine air intake, engine cooling), traction control, transmission, suspension, brakes (e.g., braking response), coolant flow rate, body roll/lean, vehicle height, driver assist functions, etc. Each of these system operating parameters may be configured in the corresponding ECU by the manufacturer to achieve certain results, such as a target horsepower, an acceleration profile, a fuel consumption rate, a tactile steering response, a level of shock dampening, etc.

Collectively, operating parameters, such as defined in a vehicle functionality profile, give riders (e.g., drivers, passengers) of vehicles a certain feel and/or performance. In some aspects, the operating parameters may collectively provide a certain feel and/or performance indicative of a make (e.g., coupe, sedan, sports utility vehicle (SUV)) and/or type (e.g., muscle, supercar, luxury, economy, etc.) of vehicle. Because different vehicle models may contain a different number and/or combination of ECUs configured with different operating parameters, each vehicle model may have a unique vehicle functionality profile (e.g., a unique feel and/or performance). In some aspects, with cars as an example, a vehicle functionality profile may be defined by a set of operating parameters (e.g., a set of values for the operating parameters) that collectively emulates a known/existing make and model of a car (e.g., rather than a general category of cars), such as a Ford Mustang, Cadillac Escalade, Porsche 911 Carrera, Honda Civic, Chevy Camaro, Mercedes S550, etc., which can be extended to specific years or range of years or just defaulted to the current model year. For example, by applying a vehicle functionality profile associated with a Ford Mustang to the vehicle, the vehicle may emulate a certain feel and/or performance associated with the Ford Mustang.

Different vehicles (e.g., different makes and/or models of a car, UAV, or other vehicle) may be tested for compatibility with the vehicle functionality profiles, such as during design and manufacture of the vehicles and/or post-manufacturing of the vehicles. Compatibility of a vehicle with a vehicle functionality profile may be based at least on whether the vehicle can be operated safely (e.g., safe balance, safe temperature, safe turns, etc.) when the vehicle functionality profile is applied to an operation of the vehicle. For a given vehicle, the vehicle may be tested for compatibility with one or more of the predetermined vehicle functionality profiles and certified accordingly. In some cases, testing of a vehicle functionality profile on the vehicle post-manufacturing may occur when the vehicle functionality profile is defined after the vehicle has been manufactured. For example, testing of the vehicle functionality profile may be performed on other vehicles of the same make and model as the vehicle after the vehicle has been manufactured to determine whether the vehicle functionality profile may be safely applied to the vehicle.

Certification services of the vehicle with various vehicle functionality profiles may be provided by the provider of the vehicle functionality profile management system (e.g., vehicle OEM) and/or other authorized party. In some aspects, the vehicle functionality profile management system may store the vehicle functionality profiles, data indicative of which vehicle functionality profiles can be applied to which vehicles, and/or other data. In some cases, the vehicle functionality profiles may be obtained by the user via an e-commerce transaction. For example, while a vehicle may be certified to use a certain vehicle functionality profile, the vehicle may not be allowed to apply the vehicle functionality profile without the vehicle functionality profile having been purchased by the user (e.g., vehicle manufacturer, vehicle administrator, rider of the vehicle) for use with the vehicle. In some cases, purchase of the vehicle functionality profile may be tied to the user rather than the vehicle, such that the user may apply the purchased vehicle functionality profile to vehicles associated with the user or to be associated in the future with the user (e.g., vehicles the user buys, rents, or hails at a later date). In some cases, to facilitate utilization of the vehicle functionality profiles by a user, the vehicle functionality profiles may be identified by a make, model, and/or type of vehicle provided by or emulated by (e.g., approximated by) the vehicle functionality profiles.

The vehicle functionality profiles may take many different forms. For example, vehicle functionality profiles may be configuration files, data structures, markup language documents, text files, etc. For a given vehicle, the vehicle functionality profiles may be processed (e.g., parsed) by a processor of the vehicle to obtain corresponding operating parameters and these operating parameters provided to appropriate ECUs to control operation of the vehicle. These vehicle functionality profiles may be utilized by consumers so that the consumer may enact changes to their vehicle's feel and/or performance to emulate other vehicle makes, models, and/or types. For example, a consumer may desire to alter the feel and performance of the consumer's economy sedan to emulate and/or mirror luxury sedans. In this example, the consumer's economy sedan may emulate the feel and performance of a luxury sedan by selecting one of one or more appropriately designed vehicle functionality profiles associated with luxury sedans (e.g., a luxury sedan vehicle functionality profile) to apply to the economy sedan. For instance, the selected vehicle functionality profile may be defined by operating parameters that collectively emulate the feel and performance of a Mercedes S550.

In an embodiment, a generic vehicle may be manufactured that is without any intended bias in design towards a sports car or a luxury sedan, and the generic vehicle may be given programmed instructions including a vehicle functionality profile (e.g., a collection of operating parameters) associated with either a sports car or a luxury sedan, and then driven. The vehicle functionality profile of the sports car may contain operating parameters quite different from the vehicle functionality profile of the luxury sedan.

Some example operating parameters of the vehicle functionality profile for the sports car vehicle functionality profile may include short gear ratios in the gear box (e.g., providing high torque at low speeds), high amounts of air intake in the engine, lower spring rate in the suspension (e.g., lower to the ground ride), etc. The sports car vehicle functionality profile may allow a fast acceleration and high speed ride (e.g., within regulated limits). In one example, the vehicle functionality profile may be designed to emulate the feel and performance of a Ford Mustang. Some example operating parameters of the vehicle functionality profile for the luxury sedan may include long gear ratios in the gear box (e.g., providing smooth acceleration and increased fuel economy), normal amounts of air intake in the engine, instituted speed control, high damping in the suspension (e.g., for a smoother ride), etc. The luxury sedan vehicle functionality profile may allow a ride with smooth acceleration and speed. It can be appreciated from the above examples that the sports car vehicle functionality profile provide a markedly different performance or feel than the luxury sedan vehicle functionality profile.

In some aspects, in addition to a vehicle functionality profile, the vehicle may also receive vehicle ride preferences to be applied to the vehicle. In some cases, the vehicle ride preferences may be provided to the vehicle by the user device. The vehicle ride preferences (e.g., also referred to as ride preferences) may be provided along with the vehicle functionality profile, or as a separate communication(s). While the vehicle functionality profiles may be associated more directly with physical settings of the vehicle (e.g., braking force, coolant flow rate, etc.), vehicle ride preferences may be associated with other aspects of the user's ride experience. Vehicle ride preferences may be defined based on user comfort, user safety, smoothness of ride, energy efficiency, and/or other factors associated with user experience and/or vehicle performance.

By way of non-limiting example, vehicle ride preferences may include a temperature (e.g., temperature range) to be maintained in a cabin (or a portion thereof) of the vehicle, music (e.g., type of music, user's playlist) to be played in the cabin (or a portion thereof), and route settings (e.g., scenic route, closest route, fastest route based on current traffic) to be applied to a global positioning system (GPS) or other navigation system of the vehicle. For an unmanned vehicle (e.g., autonomously driven car or drone), other vehicle ride preferences may include a speed and/or driving style (e.g., drive in faster or slower lanes of highways) of the unmanned vehicle. In some cases, based on the vehicle ride preferences, the user may select the route to be traversed by the vehicle, or the vehicle may have autonomy on selecting the route. Alternatively or in addition to providing vehicle ride preferences using the user device, the vehicle ride preferences may be readily adjusted by the user by pressing buttons, turning knobs, or controlling various other types of controls provided by the vehicle, such as to adjust an air-conditioner, change music volume, change music, set a GPS, etc. In some cases, a combination of vehicle ride preferences may be utilized to provide a desired cabin feel for the vehicle, such as a desired cabin feel of a sports car or a luxury sedan. For example, the vehicle ride preferences may include a combination of a motion feel, an exhaust note, an engine noise, a brake noise, a wheel noise, a road noise, a steering feel, engine vibrations, a throttle/brake/clutch pedal feel, a smell (e.g., burning tires), and/or cabin temperature.

In some aspects, the vehicle functionality profiles may be coupled to (e.g., matched to) a set of default ride preferences. As one example, the provider of the vehicle functionality profile may suggest a set of default ride preferences for the user to manually set when the vehicle functionality profile is applied. As another example, the provider may bundle the vehicle functionality profile together with the set of default ride preferences, such that the vehicle functionality profile and the associated set of default ride preferences are applied to the vehicle. While the default ride preferences may be applied along with the vehicle functionality profile to the vehicle, the default riding preferences may be readily adjustable/customizable by a user of the vehicle. For example, a sports car vehicle functionality profile may be coupled to a set of default ride preferences such that the sports car vehicle functionality profile and the set of default ride preferences collectively emulate a feel and performance of a sports car (e.g., a particular known make and model such as a Ford Mustang). In this example, for a sports car vehicle functionality profile, a ride preference may include presenting data rich instrumentation in a cockpit console (e.g., telemetry information and/or systems status information). The sports car vehicle functionality profile may allow a fast acceleration, high speed, tightly controlled ride, with ample information presentation to allow a user (e.g., the driver) to monitor the relevant systems of the vehicle. As another example, a luxury sedan vehicle functionality profile (e.g., to emulate a feel and performance of a particular known make and model such as a Mercedes S550) may create a smooth accelerating, controlled, luxury ride, with entertainment provided to enhance the experience of the ride.

In some embodiments, to facilitate application and portability of vehicle functionality profiles, user devices (e.g., also referred to as personal electronic devices or client devices) may communicate with the vehicles directly or via one or more networks connected to the user devices and the vehicles. For example, the user devices and vehicles may communicate with each other directly (e.g., wirelessly via Bluetooth® communications, near-field communications (NFC), etc. and/or wired via universal serial bus (USB) communications) and/or via one or more networks (e.g., cellular networks).

For a given vehicle, the vehicle may receive data indicative of an identity of a user of a user device, such as during a handshake procedure between the vehicle and the user device. In an aspect, the handshake procedure may be, may include, or may be a part of, an authentication procedure. Based on the identity of the user, the vehicle may determine whether the user of the user device has vehicle profile setting privileges (e.g., also referred to as vehicle functionality profile setting privileges or profile setting privileges). In an aspect, the user that has vehicle profile setting privileges may be referred to as a captain of the vehicle. The captain of the vehicle may be the user that owns the vehicle, rents the vehicle, has hailed the vehicle for a trip (e.g., through a ridesharing service), or otherwise has previously been designated by some party (e.g., owner, renter, previous captain, vehicle administrator) as the captain of the vehicle. In another example, the captain of the vehicle may be the user seated in a particular seat of the vehicle (e.g., pilot's seat), which may be determined based on object detection technology provided by the vehicle and/or weight detected on seats of the vehicle.

In some cases, the captain may designate how the handshake operation is performed (e.g., whether the captain's device or the vehicle initiates the handshake operation), who can apply the vehicle functionality profile (e.g., a listing or ranked listing of captains in which each captain is associated with a priority value), and/or how the vehicle functionality profile may be transferred to the vehicle. In some cases, the captain may provide settings to the vehicle and/or user device during an initial setup of the vehicle and/or in a user profile of the captain (e.g., user profile for a vehicle rental service).

If the vehicle determines that the user has vehicle profile setting privileges (e.g., the user is a captain), the vehicle may receive a vehicle functionality profile associated with the captain. In some cases, the vehicle may receive the vehicle functionality profile from the user device (e.g., smartphone, smartwatch, tablet device) of the user. The vehicle may determine whether the vehicle functionality profile can be applied to the vehicle. The vehicle may apply the vehicle functionality profile to an operation of the vehicle when the vehicle determines that the vehicle functionality profile can be applied to (e.g., vehicle functionality profile is compatible with) the vehicle. In some cases, the vehicle functionality profile can be applied only while the vehicle is not in transit (e.g., to ensure safety of the riders). For example, the vehicle functionality profile may be changed only when the vehicle is completely parked. Upon successfully applying the vehicle functionality profile, the vehicle may indicate that the vehicle functionality profile has been successfully applied. For example, the vehicle may display a textual and/or pictorial indication on a monitor provided in the vehicle and/or transmit the textual and/or pictorial indication to the user's device (e.g., for display by the user's device).

In an aspect, a vehicle functionality profile that can be applied to the vehicle may be referred to as being compatible with the vehicle. In contrast, a vehicle functionality profile that cannot be applied to the vehicle may be referred to as being not compatible with the vehicle. In some cases, the user device may identify the vehicle based on data received by the user device from the vehicle during the handshake procedure, such as an official vehicle identification number of the vehicle or generally any vehicle identifier (e.g., name, number) previously applied to the vehicle by a user, and the user device may transmit to the identified vehicle the vehicle functionality profile associated with the identified vehicle.

If the vehicle determines that the vehicle functionality profile cannot be applied to the vehicle, in some embodiments, the vehicle may transmit to the user device of the user a listing of vehicle functionality profiles that can be applied to the vehicle. The vehicle may then receive from the user device a vehicle functionality profile selected from the listing and apply the vehicle functionality profile. If the vehicle receives no response from the user device pertaining to a selected vehicle functionality profile, the vehicle can apply a default vehicle functionality profile (e.g., previously set by a manufacturer of the vehicle, a vehicle administrator, the user, or other party).

In an embodiment, the vehicle may receive data indicative of different users' identities from different user devices, request a vehicle functionality profile from the user that has profile setting privileges (e.g., the user associated with the highest priority value), and apply (if compatible) the vehicle functionality profile provided by the user that has profile setting privileges. Vehicle functionality profiles from users without profile setting privileges (if received) may be ignored (e.g., dropped) by the vehicle. In some cases, the vehicle may transmit a message to the user device of the user confirming that the user has vehicle profile setting privileges, and/or the vehicle may transmit a message indicating to the user devices of the other users that they do not have profile setting privileges (e.g., they are not captains of the vehicle). In some cases, when the vehicle is used exclusively by non-captains (e.g., and a captain does not temporarily transfer profile setting privileges), the vehicle may operate according to previously provided settings and may indicate to user devices of the non-captains (e.g., via corresponding apps installed on the user devices) the vehicle functionality profile that has been successfully applied. For example, based on previously provided settings (e.g., from a captain, vehicle administrator, vehicle manufacturer, etc.), the vehicle may apply a default vehicle functionality profile (e.g., previously set by the captain, vehicle administrator, vehicle manufacturer, etc.) or may allow any non-captain to select and apply a vehicle functionality profile.

In some aspects, the vehicle may only have one captain assigned at a time. The captain may temporarily, permanently, and/or conditionally transfer vehicle profile setting privileges to another user. For example, the captain may conditionally transfer vehicle profile setting privileges based on time of day, day of week, duration of vehicle usage, purpose of vehicle usage, vehicle functionality profile another user intends to apply, and/or other conditions. In other aspects, the vehicle may have multiple users with vehicle profile setting privileges (e.g., multiple captains). In these aspects, each captain may be associated with a priority value. For example, when nine different users are designated as captains of the vehicle, each of the nine captains may be associated with a different priority value between 1 and 9, inclusive, where 1 is assigned to the captain with the highest priority and 9 is assigned to the captain with the lowest priority. In this example, when the user devices of the captain assigned a priority value of 2 and the captain assigned a priority value of 6 are providing vehicle functionality profiles to the vehicle, the vehicle applies the vehicle functionality profile of the captain assigned the priority value of 2. The captains may temporarily or permanently adjust the priority values of the various captains and/or add captains (e.g., introduce a new tenth captain and redefine priority values as being between 1 and 10, inclusive). In an aspect, as captains board and/or exit the vehicle, the vehicle may adjust the vehicle functionality profile applied to the vehicle based on the relative priority values associated with the captains in the vehicle after such boarding and/or exiting. Other manners by which users can be designated as captains and/or assigned priority values can be utilized.

In some cases, ride preference setting privileges may, but need not, be set. Users with profile setting privileges may not have ride preference setting privileges, and vice versa. In one case, the riding preference setting privileges may exclusively be with the captain of the vehicle or the captain of the highest priority value who is in the vehicle. In some cases, all users (e.g., riders) of the vehicle have riding preference setting privileges by default. In an aspect, the ride preference setting privileges may pertain primarily to configuring the vehicle using a user device to communicate with the vehicle. For example, any user (e.g., rider) of the vehicle may still adjust the ride preferences by manually adjusting appropriate buttons, knobs, etc. to control the corresponding system (e.g., air-conditioning system, music system, GPS, etc.), such as to effectuate a desired cabin feel, regardless of whether the user has ride preference setting privileges.

The vehicle may try to accommodate vehicle ride preferences of multiple users (e.g., riders) of the vehicle. As one example, when multiple users have set a cabin temperature preference, the vehicle may maintain the cabin temperature (e.g., by controlling the air-conditioning system) at around an average of the cabin temperatures provided by the users. As another example, when one user has set a faster speed preference than another user, the vehicle may determine the vehicle ride preference associated with higher safety given traffic conditions and operate based on the determined vehicle ride preference (e.g., autonomously drive in a lane(s) appropriate for the lower speed preference or an average of the different speed preferences). As yet another example, to facilitate navigation of the vehicle to different destinations, the vehicle may determine an efficient route to reach each of the different destinations based on the locations of the destinations while considering route settings (e.g., scenic route, closest route, fastest route) of the various users. In an aspect, as users (e.g., riders) board and/or exit the vehicle, the vehicle may adjust the vehicle based on the vehicle ride preferences of the users who are in the vehicle after such boarding and/or exiting. For example, a user may be considered to have exited the vehicle when the user is no longer detected by the vehicle (e.g., using object recognition technology and/or weight applied on the vehicle's seats).

Thus, in various embodiments, by tying a user's vehicle functionality profiles and ride preferences to the user's device(s) and/or user's account (e.g., account for a service that facilitates vehicle ownership, rental, or sharing), the user has ready access to vehicle functionality profiles and/or ride preferences (e.g., stored on one or more user devices of the user or on a remote server or in the cloud accessible to the user) that the user can apply to a vehicle. Vehicle functionality profiles may be coupled to vehicle ride preferences to collectively provide a desired feel and performance. In some cases, a vehicle functionality profile may be coupled to one or more vehicle ride preferences to collectively emulate a make and/or model of an existing car type (e.g., emulate a Cadillac Escalade or Porsche 911 Carrera). For example, the vehicle ride preferences may provide a certain cabin feel. In general, the vehicle ride preferences may be readily adjusted by the user. In some cases, the user may have multiple user devices configured to communicate with the vehicle. For example, the multiple user devices and the vehicle may have appropriate hardware, software, and/or firmware that may interface each other. In some cases, such interfacing between the user devices and the vehicle may be performed via corresponding applications installed on the user devices and the vehicle.

In some aspects, the user may set a vehicle functionality profile and/or ride preferences to be provided automatically to any vehicle that the user device can authenticate itself to. For example, the user may set the manner by which the user device and the vehicle communicate automatically, such that minimal manual interaction from the user is needed. In other aspects, the user may set different vehicle functionality profiles and/or ride preferences to be applied to different vehicles to be used by the user (e.g., vehicles owned, rented, or otherwise scheduled for use by the user). This contrasts with cases where the user needs to manually set the vehicle functionality profile and ride preferences to apply to a vehicle on a vehicle-by-vehicle basis. For example, such manual setting of the vehicle functionality profile and ride preferences on a vehicle-by-vehicle basis may be especially inconvenient when the user does not own a vehicle but rather intends to rent vehicles for short durations of time.

Turning now to the figures, FIGS. 1A, 1B, 1C, and 1D illustrate examples of network environments 100A, 100B, 100C, and 100D, respectively, for facilitating application and portability of vehicle functionality profiles and vehicle ride preferences in accordance with one or more embodiments of the present disclosure. Not all of the depicted components may be required, however, and one or more embodiments may include additional components shown in the figure. Variations in the arrangement and type of the components may be made without departing from the spirit or scope of the claims as set forth herein. Additional components, different components, and/or fewer components may be provided.

It is noted that sizes of various components and distances between these components are not drawn to scale in FIGS. 1A-1D. In FIGS. 1A-1D, arrows represent signal communication between two components. For example, in FIG. 1A, an arrow 112 represents signal communication between a vehicle 105 and a user device 110. In some cases, the arrow 112 may represent a wireless connection(s), a wired connection(s), or wireless connection(s) and wired connection(s). Furthermore, although FIGS. 1A-1D depict vehicles (e.g., 105, 130) as a car, techniques described herein may generally be applied to any terrestrial vehicle, naval vehicle, and/or aerial vehicle.

In FIG. 1A, the network environment 100A includes the vehicle 105, the user device 110, a network 115, a user profile management system 120, and a vehicle functionality profile management system 125. The vehicle 105, user device 110, network 115, user profile management system 120, and vehicle functionality profile management system 125 may be in communication directly or indirectly. As used herein, the phrases "in communication," "communicatively connected," and variances thereof, encompass direct communication and/or indirect communication through one or more intermediary components and does not require direct physical (e.g., wired and/or wireless) communication and/or constant communication, but rather additionally includes selective communication at periodic or aperiodic intervals, as well as one-time events.

The vehicle 105 may be operated based on a vehicle functionality profile applied to the vehicle 105. The vehicle functionality profile applied to the vehicle 105 may be a default vehicle functionality profile (e.g., set by a manufacturer, a vehicle administrator, a provider of the vehicle 105, a provider of a service, or a user of the vehicle 105) or a vehicle functionality profile selected by a user (e.g., current user) of the vehicle 105. The user of the vehicle 105 may be a driver or a passenger. In some cases, the vehicle 105 may be an unmanned vehicle, in which each user of the vehicle 105 is a passenger. In some cases, the vehicle 105 may have no riders. For example, the user of the vehicle 105 may use the vehicle 105 to transport payload (e.g., package, sensor equipment). For a given operation (e.g., a trip(s)) of the vehicle 105, one or more users of the vehicle 105 may have profile setting privileges for the vehicle 105. In some cases, the vehicle 105 may also be operated based on ride preferences applied to the vehicle 105. The ride preferences may be from users (e.g., riders) of the vehicle 105 that may or may not have profile setting privileges. In an aspect, a user with ride preference setting privileges does not have profile setting privileges, and vice versa.

The vehicle 105 may include a vehicle communication unit (e.g., also referred to simply as a communication unit). The communication unit may include one or more radio transceivers (e.g., antennas) along with associated logic, circuitry, interfaces, memory, and/or code that enable communications (e.g., with the user device 110, network 115, user profile management system 120, vehicle functionality profile management system 125, and/or other devices) via wireless interfaces and using the radio transceivers. In an embodiment, the vehicle 105 may send and/or receive information via communications in accordance with wireless communication standards or protocols, such as a cellular standard, Institute of Electrical and Electronics Engineers (IEEE) 802.11 standard, Bluetooth® standard, ZigBee® standard, and/or other wireless standards; NFC; infrared-based communications; optical-based communications; and/or other appropriate communication standards and/or protocols. In some cases, the vehicle 105 may be configured to communicate with the user device 110, network 115, user profile management system 120, vehicle functionality profile management system 125, and/or other devices using a proprietary wireless communication protocol and interface.

Alternatively or in addition, the communication unit of the vehicle 105 may include suitable logic, circuitry, interfaces, memory, and/or code that enable wired communications (e.g., with the user device 110, network 115, user profile management system 120, vehicle functionality profile management system 125, and/or other devices). In this regard, the vehicle 105 may be configured to interface with a wired network, such as via an Ethernet interface, a power-line modem, a Digital Subscriber Line (DSL) modem, a Public Switched Telephone Network (PSTN) modem, a cable modem, and/or other appropriate components for wired communication. A wired link may be implemented with a USB cable, power-line cable, coaxial cable, fiber-optic cable, or other cable or wires that support corresponding wired network technologies. For instance, the communication unit of the vehicle 105 may be, or may include, a USB port that can receive a USB cable. When the USB cable is used to connect the user device 110 to the vehicle 105, the USB cable may be used to transmit data to and/or receive data from the user device 110.

The user device 110, network 115, user profile management system 120, vehicle functionality profile management system 125, and/or other devices may include communication units appropriate for communicating with each other and/or the vehicle 105. By way of non-limiting examples, the user device 110 may be, and/or may include, a mobile phone (e.g., smartphone), smartwatch, a personal digital assistant (PDA), a tablet device, a laptop device, a watch, a computer, or generally any device that is operable to communicate via wireless communication (e.g., via cellular standards using antennas) and/or wired communication (e.g., USB). In some cases, to allow the user to apply vehicle functionality profiles to various vehicles, the user device 110 may be a portable device.

In some embodiments, the communication unit of the vehicle 105 may communicate directly with the user device 110 (e.g., directly with a communication unit of the user device 110 in a non-networked manner), such as via Bluetooth communication and/or NFC communication. For instance, the communication unit of the vehicle 105 may be, or may include, an NFC device (e.g., NFC tag) in the cabin of the vehicle 105 that may transmit data to and/or receive data from the user device 110 when the user device 110 is placed in proximity of the NFC device.

Alternatively or in addition, in some embodiments, the vehicle 105 may be in communication with other components via the network 115. As one example, the network 115 may be, may include, or may be a part of, a cellular network.

In this example, the communication unit of the vehicle 105 may send and/or receive information over the cellular network (e.g., 3G, 4G, 5G, other 3GPP-based cellular network, and/or other cellular network), such as to and/or from the user device 110 via one or more base stations (not shown in FIG. 1A) of the network 115. The base station(s) may be macrocell base station(s), microcell base station(s), picocell base station(s), femtocell base station(s), and/or other cell sizes. Although the network 115 is depicted as a single network, the network 115 may include one or more networks. In this regard, the network 115 may represent one or more wireless networks (e.g., cellular network, Wi-Fi network) and/or one or more wired networks.

The user profile management system 120 may include components for managing user profiles. The user profile management system 120 may store, or may otherwise have access to, user profiles. Each user profile may be associated with a user. For a given user, the user profile may include an identity of the user (e.g., account username, name, contact information, biometrics, etc.). In some aspects, the user profile may include a vehicle functionality profile and/or vehicle ride preferences set by the user that the user intends to apply to vehicles (e.g., the vehicle 105) used by the user. In an aspect, the user profile management system 120 may include data identifying vehicles associated with the user, and whether the user has profile setting privileges on a vehicle-by-vehicle basis. In some cases, the user profile may allow the user to indicate the vehicle functionality profile and/or vehicle ride preferences to be applied to all vehicles associated with the user. For example, setting a common vehicle functionality profile to all vehicles associated with the user may be useful for fleet management. In other cases, the user profile may allow the user to indicate different vehicle functionality profiles and/or vehicle ride preferences on a vehicle-by-vehicle basis. In an embodiment, the user profile management system 120 may be provided by a service provider (e.g., vehicle rental provider), mobile network operator, and/or another party. The user profile management system 120 may provide vehicle selling, renting, and/or sharing services and/or may provide services for storing data for and/or interfacing with such vehicle selling, renting, and/or sharing services.

The user profile management system 120 may manage user profiles, such that existing user profiles may be deleted (e.g., users manually deleted their user profiles, users did not renew their subscription, etc.) and/or new user profiles may be set up (e.g., new users subscribe to a service, such as a car rental service, and/or existing users opening another account). For example, the user profile management system 120 may host a website, an application, or otherwise provide an interface to allow new users to set up an account and/or existing users to adjust their settings (e.g., vehicle functionality profiles, ride preferences, identification information, contact information, etc.) or delete their accounts. In some cases, the user profile management system 120 may perform authentication processes and/or provide data (e.g., transmit data or otherwise allow access to data) to facilitate performing of authentication processes (e.g., by the vehicle 105 or other devices).

The vehicle functionality profile management system 125 may include components for managing vehicle functionality profiles. The vehicle functionality profile management system 125 may store, or may otherwise have access to, vehicle functionality profiles. In some cases, new vehicle functionality profiles may be developed and stored on the vehicle functionality profile management system 125 (e.g., after the new vehicle functionality profiles have been tested for safety and approved), and/or existing vehicle functionality profiles may be disabled (e.g., removed, marked as obsolete, marked as unsafe, etc.). In some aspects, the vehicle functionality profiles may be stored in the vehicle functionality profile management system 125 as a listing of predetermined vehicle functionality profiles.

In some aspects, the vehicle functionality profile management system 125 may store the vehicle functionality profiles, data indicative of which vehicle functionality profiles can be applied to which vehicles (e.g., vehicle makes and/or models), and/or other data. In an embodiment, different vehicles (e.g., different makes and/or models of a car, UAV, or other vehicle) may be tested for compatibility with the vehicle functionality profiles, such as during design and manufacture of the vehicles or post-manufacturing of the vehicles. In some cases, such as for compatibility of a vehicle functionality profile that is determined after manufacture of the vehicle 105, the vehicle functionality profile management system 125 may provide an update to the vehicle 105 to indicate whether the vehicle functionality profile can or cannot be applied to the vehicle 105. In some cases, the vehicle functionality profile management system 125 may provide, facilitate, and/or otherwise be associated with, certification services that certify compatibility of the vehicle with various vehicle functionality profiles. Alternatively or in addition, in some cases, the vehicle functionality profile management system 125 may provide, facilitate, and/or otherwise be associated with, certification services that certify the various vehicle functionality profiles.

In an aspect, the vehicle functionality profile management system 125 and/or the vehicle functionality profiles may be provided and maintained by a vehicle OEM. For example, the vehicle functionality profile management system 125 and/or the vehicle functionality profiles may be maintained at least in part by a group of vehicle manufacturers (e.g., a group of car manufacturers). A manufacturer of each vehicle (e.g., the vehicle 105) may have a database of associated and safe vehicle functionality profiles that can be associated with the vehicle's version/vintage. In some cases, third parties, such as ride hail companies, rental companies, and other service providers, may provide their respective services by accessing the vehicle functionality profile management system 125. In some cases, the provider of the vehicle functionality profile management system 125 may also provide the user profile management system 120, and/or may otherwise operate in conjunction with or be associated with a provider of the user profile management system 120. The user profile management system 120 and/or vehicle functionality profile management system 125 may be provided by cloud-based servers.

In some embodiments, to facilitate application and portability of vehicle functionality profiles and vehicle ride preferences, the vehicle 105 may communicate with the user device 110. In an aspect, the vehicle 105 and the user device 110 may have corresponding applications installed, such that the vehicle 105 and the user device 110 may interface (e.g., communicate, exchange data) with each other via the corresponding applications. A handshake procedure (e.g., also referred to as an authentication procedure) may be performed between the user device 110 and the vehicle 105 to allow secure authentication. During the handshake procedure, the user device 110 may transmit authentication data to the vehicle 105. The authentication data may include data indicative of an identity of a user of the user device 110. The identity of the user may include a name (e.g., account username, legal name, etc.), account number, biometrics, and/or generally any identification data that may be utilized by the vehicle 105 to authenticate the user. For example, the identity of the user may be an account username of an application logged in by the user. The authentication data may include the account username and a passcode associated with the account. The identity of the user may also include user privileges to set a vehicle functionality profile and ride preferences.

The handshake procedure may be initiated by the user device 110 or the vehicle 105. The handshake procedure may be conducted via messages communicated between the user device 110 and the vehicle 105. The transfer of authentication data to the vehicle 105 may be initiated by the user device 110, or the authentication data may be transferred by the user device 110 in response to a query from the vehicle 105.

In some cases, the handshake procedure may be set to occur automatically when a distance between the user device 110 and the vehicle 105 is within a threshold distance. Depending on communication method, the threshold distance may be from a few inches to a few meters. As one example, the vehicle 105 may be, or may include, an NFC device (e.g., NFC tag) that may transmit data to and/or receive data from the user device 110 when the user device 110 is placed in proximity of the NFC device (e.g., within a few inches). For instance, the user may bring the user device 110 close to the NFC device installed in the vehicle 105. As another example, using geolocation/fencing approaches, the vehicle 105 may monitor for devices (e.g., up to a few meters) with appropriate capability for providing authentication data and/or vehicle functionality profiles to the vehicle 105 and initiate a query to the user device 110 (e.g., an application installed on the user device 110) when the user device 110 is within a threshold distance. In one case, the communication between the user device 110 and the vehicle 105 may be via Wi-Fi, cellular, and/or Bluetooth communication.

In some aspects, the vehicle 105 may authenticate the user device 110 based on user profiles stored in the vehicle 105. For example, the vehicle 105 may compare the authentication data provided by the user with data contained in the user profiles stored in the vehicle 105 to determine whether there are any matches. In other aspects, the vehicle 105 may authenticate the user device 110 by communicating with the user profile management system 120. In these aspects, the vehicle 105 may relay the authentication data (or a portion thereof) received from the user to the user profile management system 120. The user profile management system 120 may perform authentication of the user and indicate to the vehicle 105 and/or user device 110 whether authentication is successful, and/or the user profile management system 120 may provide information to the vehicle 105 to allow the vehicle 105 to perform authentication.

Other approaches by which to perform a handshake procedure may be utilized. In general, a manner by which to initiate and/or perform the handshake procedure may be based on settings from a user, vehicle manufacturer, vehicle administrator, and/or service provider (e.g., vehicle rental service provider). In some cases, the user of the user device 110 may set in the user device 110 and vehicle 105 which approach(es) to utilize to initiate and/or perform a handshake procedure. The user's selected approach(es) may be previously set as part of the user's settings (e.g., stored in the user device 110 and/or user profile management system 120) and/or during an initial association procedure between the vehicle 105 and the user device 110.

Upon successful authentication, the vehicle 105 may determine whether the user of the user device 110 has profile setting privileges based on the identity of the user. For example, the vehicle 105 may access the user profile and/or other data to determine whether the user of the user device 110 has profile setting privileges. Such data may be stored in the vehicle 105, user device 110, and/or user profile management system 120. In one case, the vehicle 105 may determine whether such data is stored in the vehicle 105 and, if such data is not stored in the vehicle 105, the vehicle 105 may request such data from the user profile management system 120. The vehicle 105 may then store such data received from the user profile management system 120 for future use. In some cases, the vehicle 105 may determine whether the user of the user device 110 has profile setting privileges as part of the handshake procedure.

Upon determining the user has vehicle profile setting privileges, the vehicle 105 may determine the vehicle functionality profile associated with the user of the user device 110. For example, the vehicle 105 may retrieve a vehicle functionality profile associated with the user (e.g., stored in the vehicle 105 and/or user profile management system 120) and/or request the user device 110 to provide the vehicle functionality profile to the vehicle 105. In one case, the vehicle 105 may determine whether such data is stored in the vehicle 105 and, if such data is not stored in the vehicle 105, the vehicle 105 may request such data from the user profile management system 120. The vehicle 105 may then store such data received from the user profile management system 120 for future use. In an aspect, the vehicle 105 may retrieve ride preferences associated with the user and/or request the user device 110 to provide ride preferences.

In some cases, the vehicle functionality profile may be provided together with or soon after the authentication data is provided. For example, the vehicle functionality profile may be provided before successful authentication of the user device 110. In other cases, the user device 110 may provide the vehicle functionality profile only after successful authentication of the user device 110 to the vehicle 105. In some cases, the user device 110 may receive an indication of a successful authentication and/or a failed authentication of the user device 110 to the vehicle 105 (e.g., from the vehicle 105 and/or user profile management system 120). If authentication of the user device 110 fails, the vehicle 105 and/or user profile management system 120 may indicate to the user device 110 that the authentication failed, request alternative authentication data from the user device 110, and/or ignore the user device 110 (e.g., drop subsequent communications received from the user device 110).

The vehicle 105 may determine whether the vehicle functionality profile associated with the user can be applied to (e.g., is compatible with) the vehicle 105. If the vehicle 105 determines that the vehicle functionality profile can be applied, the vehicle 105 applies the vehicle functionality profile. For example, the vehicle 105 may determine that the vehicle 105 is registered/certified to operate safely using the vehicle functionality profile. In some cases, the vehicle functionality profile may need to be purchased (e.g., by the user and/or by the manufacturer of the vehicle 105) before the vehicle functionality profile can be applied to the vehicle 105. In some cases, the vehicle 105 may also receive ride preferences from the user (e.g., in a same communication as the vehicle functionality profile or as a separate communication(s)) and apply the ride preferences to the vehicle 105.

In some cases, the user of the user device 110 may provide a listing (e.g., a ranked listing) of vehicle functionality profiles. In these cases, the vehicle 105 may go down the listing (e.g., starting from a vehicle functionality profile having a highest priority) until one of the user's vehicle functionality profiles can be applied to the vehicle 105. If none of the vehicle functionality profile(s) provided by the user of the user device 110 can be applied to the vehicle 105, the vehicle 105 may apply a default vehicle functionality profile (e.g., set by the manufacturer or vehicle administrator of the vehicle 105) that can be applied to the vehicle 105.

As another example, the vehicle 105 may transmit a listing of predetermined vehicle functionality profiles that can be applied to the vehicle 105 to the user device 110 and request selection of one or more of the vehicle functionality profiles in the listing. In an aspect, the listing of vehicle functionality profiles of the vehicle 105 may be a subset of the predetermined vehicle functionality profiles stored by the vehicle functionality profile management system 125. The user device 110 may provide to the vehicle 105 the vehicle functionality profile(s) selected by the user. Based on user settings, the vehicle 105 and/or user profile management system 120 may store the vehicle functionality profile selected by the user for future use. If the user device 110 does not provide a vehicle functionality profile to the vehicle 105 (e.g., within a threshold amount of time of the request from the vehicle 105), the vehicle 105 may apply a default vehicle functionality profile.

If the user of the user device 110 has not set a vehicle functionality profile for the user, the vehicle 105 may apply a default vehicle functionality profile. Alternatively, the vehicle 105 may request that the user device 110 provide a vehicle functionality profile and/or transmit a listing of predetermined vehicle functionality profiles to the vehicle 105 that can be applied to the vehicle 105. The user device 110 may provide to the vehicle 105 the vehicle functionality profile selected by the user. Based on user settings, the vehicle 105 and/or user profile management system 120 may store the vehicle functionality profile selected by the user for future use. If the user device 110 does not provide a vehicle functionality profile to the vehicle 105 (e.g., within a threshold amount of time), the vehicle 105 may apply a default vehicle functionality profile.

Figure 1B:
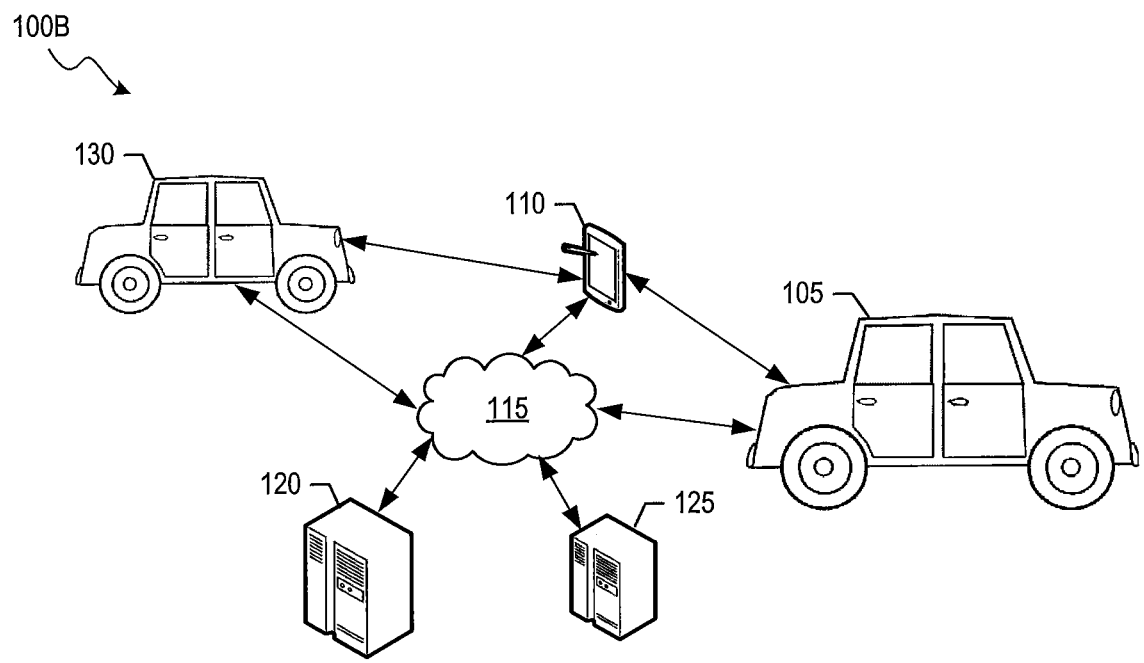

Turning now to FIG. 1B, the network environment 100B includes the vehicle 105, the user device 110, the network 115, the user profile management system 120, the vehicle functionality profile management system 125, and a vehicle 130. The description of FIG. 1A generally applies to FIG. 1B, with examples of differences between FIG. 1A and FIG. 1B and other description provided herein. In an embodiment, the vehicle 130 may be implemented in the same or similar manner as the vehicle 105 of FIG. 1A.

The user device 110 may communicate with the vehicle 105 (e.g., as described in FIG. 1A) and/or the vehicle 130. In one example, the user may manually set the vehicle 105 to which the user device 110 authenticates, such as via a selection on an application of the user device 110 or directing a signal (e.g., line-of-sight infrared signal) to the vehicle. Alternatively or in addition, in another example, the user device 110 may perform a vehicle-initiated handshake procedure with the vehicle 105 and/or 130 or a handshake procedure initiated by the user device 110, such as a handshake procedure initiated based on a distance between the vehicle 105 and the user device 110 and a distance between the vehicle 130 and the user device 110. For example, assuming successful authentication of the user device 110 to the vehicles 105 and/or 130, the vehicles 105 and/or 130 may determine whether the user device 110 has vehicle profile setting privileges for the vehicles 105 and/or 130, respectively.

To facilitate application and portability of vehicle functionality profiles of the user of the user device 110, the user device 110 may store, or may have access to (e.g., via the user profile management system 120), one or more vehicle functionality profiles of the user of the user device 110 that the user prefers to be applied to vehicles utilized by the user. The user device 110 may authenticate to the vehicle 105 and/or the vehicle 130. Similar to the vehicle 105, the vehicle 130 may communicate with the user profile management system 120 and/or the vehicle functionality profile management system 125 to facilitate the handshake procedure and/or applying of a vehicle functionality profile. The user may also have ride preferences to be applied to the vehicles 105 and/or 130. In some cases, each vehicle functionality profile may be coupled/matched (e.g., by a provider of the vehicle functionality profile, by the user, etc.) to a set of ride preferences. For example, the vehicle functionality profile and its associated set of ride preferences may be applied together to emulate a feel and performance of a certain make and model of vehicle.

The vehicles 105 and/or 130 may, but need not, store vehicle functionality profiles associated with the user of the user device 110 and/or other users. In this regard, by tying the vehicle functionality profiles of the user of the user device 110 to the user device 110, the user may conveniently apply the user's vehicle functionality profiles to different vehicles, such as the vehicles 105 and 130, based on which vehicle the user is currently using or intending to use. This contrasts with a case in which the vehicle functionality profiles of the user are tied primarily to the vehicles 105 and 130 themselves rather than to the user device 110, in which case the user may need to manually set the vehicle functionality profile to apply to the vehicle 105, vehicle 130, and other vehicles on a vehicle-by-vehicle basis. In some cases, the user may associate the same vehicle functionality profile with different vehicles, such that the user may apply the same vehicle functionality profile to these vehicles. In other cases, the user may associate different vehicle functionality profiles with different vehicles. Similarly, the description pertaining to vehicle functionality profiles may also apply to ride preferences of the user, in which case the ride preferences may be tied to the user device 110 rather than or in addition to being tied to the vehicles 105 and/or 130.

Figure 1C:
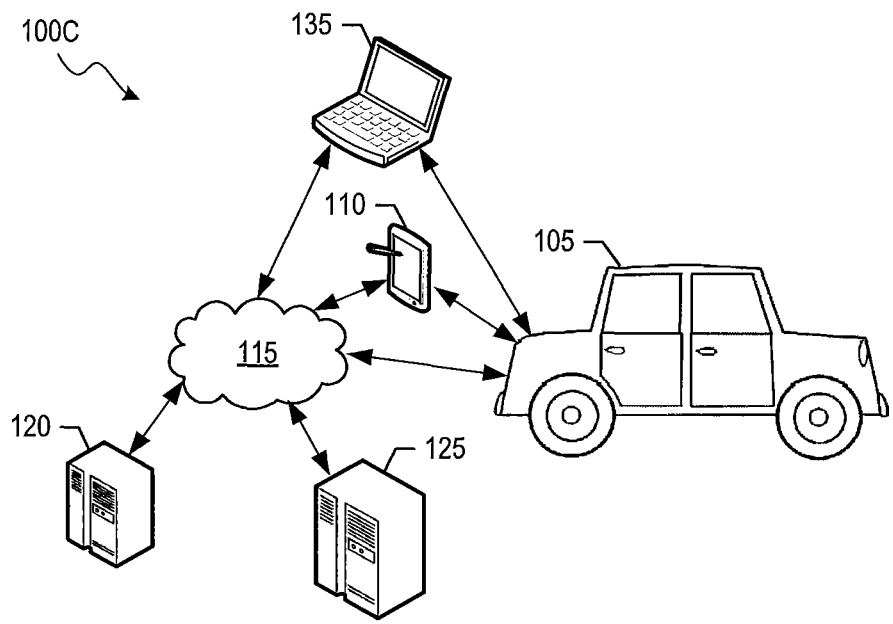

Turning now to FIG. 1C, the network environment 100C includes the vehicle 105, the user device 110, the network 115, the user profile management system 120, the vehicle functionality profile management system 125, and a user device 135. The description of FIG. 1A generally applies to FIG. 1C, with examples of differences between FIG. 1A and FIG. 1C and other description provided herein. In an embodiment, the user device 135 may be implemented in the same or similar manner as the user device 110.

The vehicle 105 may perform a handshake procedure with one or both of the user devices 110 and 135. Assuming successful authentication of the user devices 110 and 135, the vehicle 105 may determine whether the user devices 110 and 135 have vehicle profile setting privileges based on an identity of a respective user of the user devices 110 and 135. For example, the vehicle 105 may access data indicative of whether the user has profile setting privileges (e.g., stored in the vehicle 105 and/or the user profile management system 120). In some cases, the same user cannot authenticate from different devices and set profiles from each device. For example, logging into the user's account from one device may bounce any other user session currently active through any of the user's other devices, such that a latest session initiated by the user prevails.

In an aspect, the vehicle 105 may determine a vehicle functionality profile associated with the user that has operating setting privileges. For example, the vehicle 105 may access data indicative of the user's vehicle functionality profile stored (e.g., in the vehicle 105 and/or the user profile management system 120). In some cases, the vehicle 105 may only have one user with profile setting privileges assigned at a time. This user may temporarily or permanently transfer profile setting privileges to another user.

In another aspect, the vehicle 105 may allow multiple users to have profile setting privileges. In other words, the vehicle 105 allows for multiple captains. The vehicle 105 may associate each of these captains with a different priority value. If both the user devices 110 and 135 are associated with users having profile setting privileges (e.g., both users are captains), the vehicle 105 may utilize priority values previously associated with these captains when determining whose vehicle functionality profile to apply. Such priority values may be set (e.g., agreed upon) by users (e.g., captains) of the vehicle 105. In some cases, a user associated with a higher priority value may transfer profile setting privileges to a user associated with a lower priority value or no priority value (e.g., non-captain). Other manners by which different priority values may be assigned to different captains may be utilized. More generally, other manners by which a vehicle can accommodate multiple captains may be utilized.

As an example that utilizes priority values, when seven different users are designated as captains of the vehicle, each of the seven captains may be associated with a different priority value between 1 and 7, inclusive, where 1 is assigned to the captain with the highest priority and 7 is assigned to the captain with the lowest priority. In this example, when the user of the user device 110 is assigned a priority value of 2 and the user of the user device 135 is assigned a priority value of 7, the vehicle 105 applies the vehicle functionality profile of the user of the user device 110. In one example, the captain assigned a priority value of 1 may be able to assign different priority values to different captains and/or the different captains may agree on the different priority values associated to each captain.

Figure 1D:
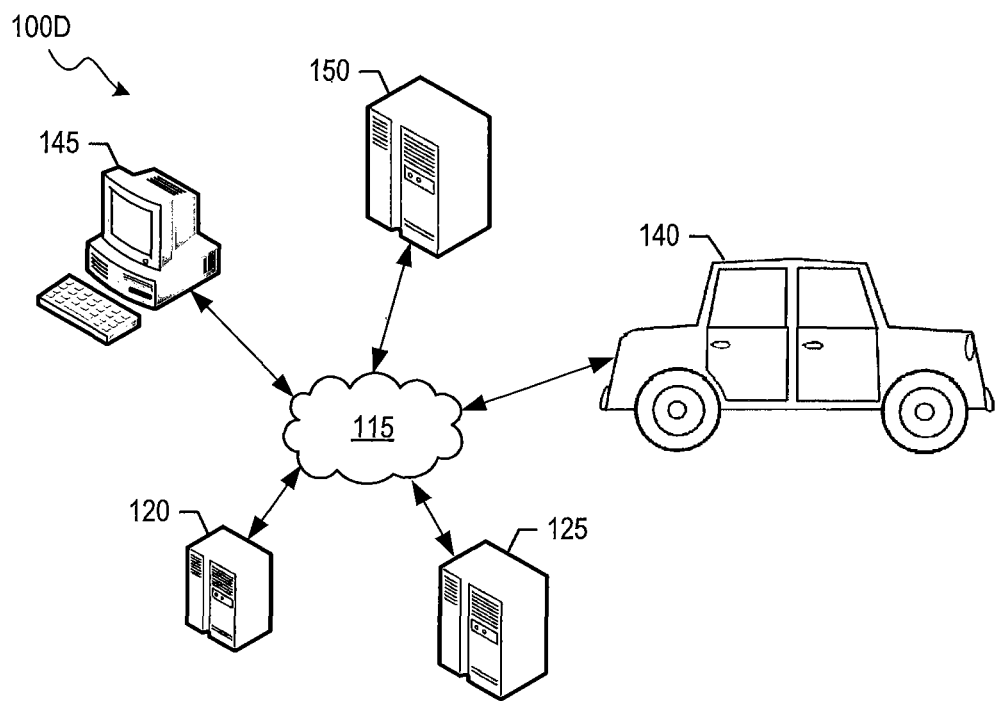

Turning now to FIG. 1D, the network environment 100D includes the network 115, the user profile management system 120, the vehicle functionality profile management system 125, a vehicle 140, a user device 145, and a vehicle management system 150. The description of FIG. 1A generally applies to FIG. 1D, with examples of differences between FIG. 1A and FIG. 1D and other description provided herein. In an embodiment, the user device 145 may be implemented in the same or similar manner as the user device 110 of FIG. 1A.

The user device 145 may communicate with the vehicle management system 150 to request the vehicle 140. By way of non-limiting example, the vehicle management system 150 may be provided by a vehicle dealership for selling and/or renting vehicles, vehicle sharing service (e.g., vehicle timeshare scheduling service), and/or other party. For instance, using the vehicle management system 150, a user of the user device 145 may buy the vehicle 140, rent the vehicle 140, or otherwise schedule use of the vehicle 140 (e.g., short-term or long-term usage of the vehicle 140 with or without ownership of the vehicle 140). In some cases, the provider of the vehicle management system 150 may also provide the user profile management system 120 and/or vehicle functionality profile management system 125 and/or may otherwise operate in conjunction with or be associated with a provider of the user profile management system 120 and/or vehicle functionality profile management system 125.

In an embodiment, the vehicle management system 150 may host a website and/or provide an application that provides the user with an interface for requesting a vehicle. In one case, the user device 145 may provide a vehicle functionality profile to the vehicle management system 150. In another case, the vehicle management system 150 may retrieve (e.g., access) a vehicle functionality profile of the user of the user device 145 from the user profile management system 120. The user device 145 may provide a selection of a vehicle, or the vehicle management system 150 may select a vehicle for the user. For explanatory purposes, the vehicle 140 is selected. The vehicle functionality profile can be applied to the vehicle 140, such as prior to the vehicle 140 being picked up by or delivered to the user.

As an example, the vehicle management system 150 may provide a vehicle timeshare scheduler service, such that the user of the user device 145 may provide a request to use a vehicle during a certain timeframe. The user may specify a vehicle functionality profile to apply to a vehicle. The user may be allowed to specify the specific vehicle to use during the timeframe, or the vehicle management system 150 may select the vehicle 140 for the user (e.g., based on the user's vehicle functionality profile, ride preferences, cost preferences, and/or other parameters). For explanatory purposes, the vehicle 140 is selected. The vehicle 140 may then be delivered to the user to accommodate the user's specified timeframe. The vehicle 140 may arrive for the user's use with the vehicle functionality profile applied. In one case, the user may not need to use the user device 145 or other device to perform a handshake procedure with vehicle 140. In another case, the user may use the user device 145 or other device to perform a handshake procedure, such that the vehicle 140 can verify the identity of the user of the vehicle 140. Since the user already provided the vehicle functionality profile to apply to the vehicle 140 when scheduling use of the vehicle with the vehicle management system 150, the user may not need to transmit the vehicle functionality profile to the vehicle 140 unless the user desires to change to another vehicle functionality profile.

In some cases, in FIGS. 1A-1C, the user devices 110 and/or 135 may generally be a portable electronic device (e.g., smartphone, smartwatch) to facilitate application and portability of vehicle functionality profiles. In FIG. 1D, the user device 145 may be a portable electronic device (e.g., smartphone, smartwatch) or a less portable electronic device, such as a desktop computer, since interfacing of the user device 145 with the vehicle 140 may be primarily via the vehicle management system 150. In some cases, the user of the user device 145 may also store information pertaining to the vehicle 140 and vehicle functionality profile in another user device (e.g., a smartphone) of the user.

Figure 2:
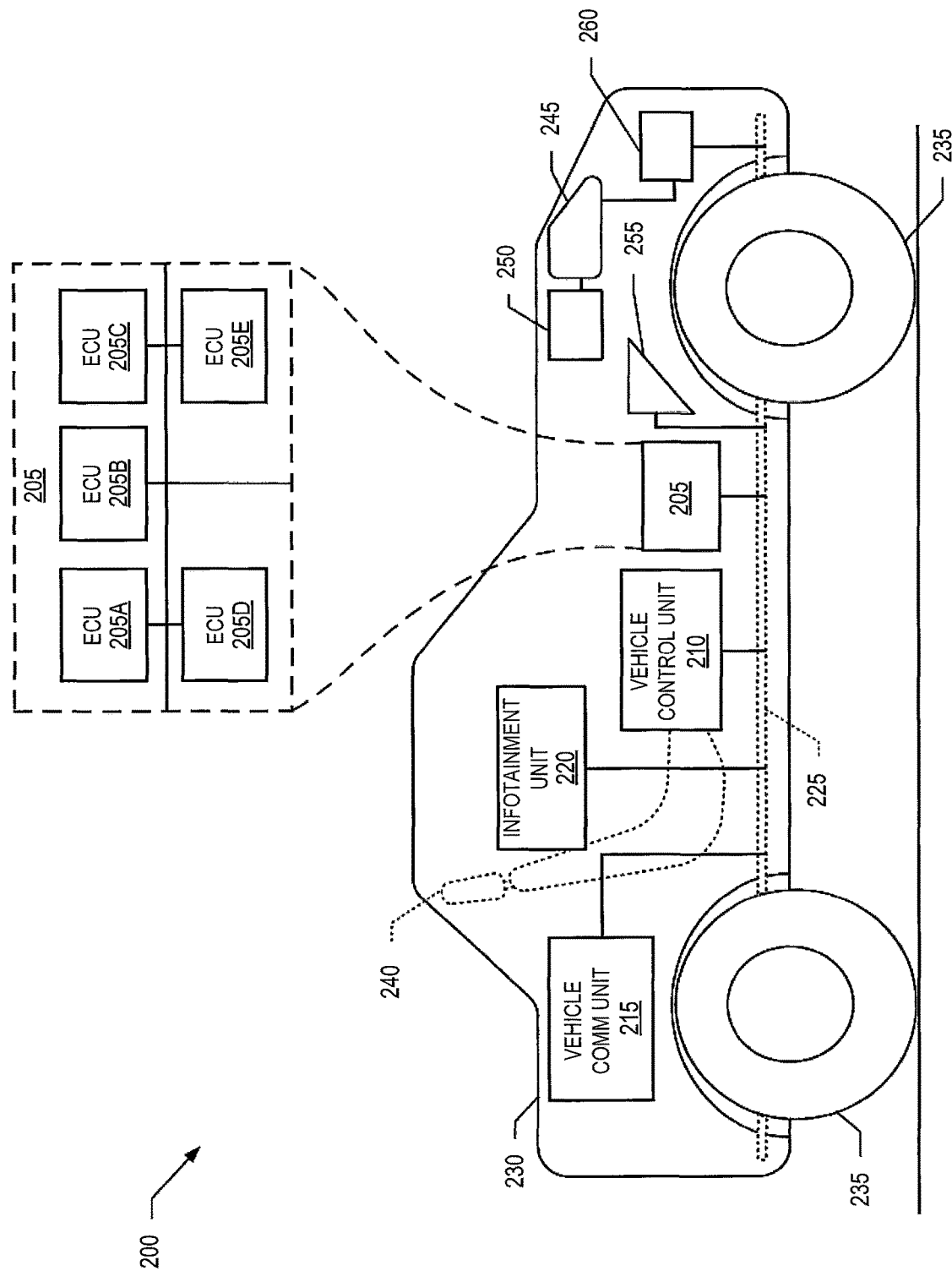
FIG. 2 illustrates an example of a vehicle in accordance with one or more embodiments of the present disclosure.

FIG. 2 illustrates an example of a vehicle 200 in accordance with one or more embodiments of the present disclosure. Not all of the depicted components may be required, however, and one or more embodiments may include additional components shown in the figure. Variations in the arrangement and type of the components may be made without departing from the spirit or scope of the claims as set forth herein. Additional components, different components, and/or fewer components may be provided. In an embodiment, the vehicle 200 may be implemented in the same or similar manner as the vehicles 105 and/or 130 of FIGS. 1A-1D. Although FIG. 2 depicts the vehicle 200 as a car, techniques described herein may generally be applied to any terrestrial vehicle, naval vehicle, and/or aerial vehicle.

The vehicle 200 includes ECUs 205 formed of ECUs 205A-E, a vehicle control unit (VCU) 210, a vehicle communication unit 215, and an infotainment unit 220 connected to and communicating via a data bus 225. The data bus 225 of the vehicle 200 may provide pathways for multiple network protocol communications (e.g., control area network (CAN), local interconnect network (LIN), media oriented system transport (MOST), etc.). In some cases, the ECUs 205, VCU 210, vehicle communication unit 215, infotainment unit 220, and data bus 225 may collectively provide a hardware platform of the vehicle 200.

The ECUs 205 of FIG. 2 may be discrete computing devices. The ECUs 205 may include a processor (e.g., a microcontroller) to process data and execute programmable instructions (e.g., assembly level instructions, functional sequential instructions, and/or object oriented instructions). The ECUs 205 may each include on-board memory (e.g., static random access memory (SRAM), electrically erasable programmable read-only memory (EEPROM), and/or flash memory) to store data received and/or generated by the ECU 205. The ECUs 205 may include input and/or output (I/O) ports such as supply voltage inputs, digital and/or analog inputs, relay drivers, H-bridge drivers, injector drivers, and/or logic outputs. These I/O ports may be used by the ECUs 205 to receive data from sensors and transmit signals to mechanical components (e.g., actuators) to affect the mechanical components' operations based on the operating parameters of the vehicle functionality profile. The received data and/or the transmitted signals may be communicated from the ECUs 205 via the data bus 225 or through a directly wired connection between the ECUs 205 and the functional component.

In some aspects, systems (e.g., engine, cooling, suspension, etc.) of the vehicle 200 may operate within confines of operating parameters configured into the systems' corresponding ECUs 205. By way of non-limiting example, the ECUs 205 may control engine performance, transmission, suspension brakes, tire inflation, and/or other aspects of the vehicle 200. Each of the ECUs 205 may control an individual system of a vehicle. In some cases, the ECUs 205 may be specialized embedded systems (e.g., small form-factor computers) that contain a processor and a memory. The ECUs 205 may accept inputs and/or produce outputs. The ECUs 205 may be given programmed instructions that can affect their output. For example, these instructions may conform to one or more automotive software architectures (e.g., automotive open system architecture (AUTOSAR) and/or manufacturer specific software architecture) corresponding to the ECUs 205.

The ECUs 205 may control operation of the vehicle 200 according to operating parameters and accept programmable instructions. The ECUs 205 may accept programmed instructions that alter the control of the corresponding vehicle system (e.g., by changing the operating parameters for that system). For example, an ECU of a cooling system (e.g., also referred to as cooling system ECU) may accept programmed instructions that alter a target pumping rate for a coolant pump of the cooling system of the vehicle 200, or an ECU such as an Engine Control Module (ECM) may accept programmed instructions that alter fuel quantities injected to a piston chamber during engine operation.

The ECUs 205 of FIG. 2 may include vehicle functional ECUs (e.g., for controlling the engine, suspension, transmission, etc.), cabin feel ECUs (e.g., for controlling seat position, cabin noise, climate control, radio systems, voice controls, entertainment systems, illumination, etc.), and/or other ECUs (e.g., for controlling doors, headlights, mirror controls, a telematic control unit managing a GPS/navigation system, etc.) for controlling systems connected to the data bus 225. Each of the ECUs 205 may monitor its corresponding system by reading sensor signals. These sensors may be placed on the mechanical components of the corresponding system and report factors such as position, temperature, speed, etc. These factors contribute to if, when, and/or how the ECUs 205 generates output signals to effectuate control over the corresponding system. As an example, a suspension ECU may adjust the suspension of the vehicle 200 based on a selected vehicle functionality profile. As another example, a door control ECU may have sensors monitoring door lock buttons, position of doors (e.g., open or closed), door locks (e.g., engaged or disengaged), and/or child lock switches (e.g., engaged or disengaged). Based on the readings of these sensors, the door control ECU may, for example, make a decision on whether or not to generate a lock engaging signal to the doors of the vehicle 200.

In some cases, each of the ECUs 205 may be of different size and/or complexity according to the system the individual ECU 205 is controlling. In the illustrated example, the ECUs 205 are in communication with other units of the vehicle 200 via the data bus 225. In some examples, the ECUs 205 may send and/or receive information and/or vehicle operation status (e.g., the status of the systems or components of the vehicle 200, diagnostic information, telemetry data, etc.) to/from a remote device (e.g., a mobile device such as a smartphone, tablet, smartwatch, etc.) via the vehicle communication unit 215 and/or may receive information (e.g., commands, vehicle functionality profiles, operating parameters, ride preferences, firmware/software updates, media files, etc.) from the remote device via the vehicle communication unit 215. For example, such information may be communicated between the ECUs 205 and the remote device using wireless (e.g., cellular, NFC, Wi-Fi, Bluetooth) and/or wired (e.g., USB) connections generated and/or managed by the vehicle communication unit 215.

The ECUs 205 may be deployed in a one-to-one fashion. In this regard, each of the ECUs 205 may be provided with processing power and system memory to control a corresponding single system of the vehicle 200. Each of the ECUs 205 may vary in size according to the complexity of the corresponding system. For example, an engine control module may be a more robust ECU than a transmission ECU. In some cases, the ECUs 205 of the vehicle 200 may be more robust than a typical ECU and capable of controlling multiple systems (e.g., the engine control module may control the engine and the transmission system). For example, a robust ECU may be provided with amounts of processing power greater than a typical ECU processor (e.g., more cores, faster clocking speeds, larger processing cache, etc.) and higher amounts of RAM to allow control of more than one system.

The vehicle 200 of FIG. 2 is provided with the infotainment unit 220 that includes components such as a dashboard display, a media center, a center console display, driver accessible buttons (e.g., temperature controls, door lock controls), etc. The infotainment unit 220 may also include a data store to store media (e.g., movies, music, television programs, podcasts, etc.), system firmware, navigation data, diagnostic information, data collected by data collection systems (e.g., cameras mounted externally on the vehicle 200, weather data collection, etc.), vehicle functionality profiles, ride preferences, etc.

The infotainment unit 220 may also function as a human machine interface that provides options to a rider (e.g., driver, passenger) of the vehicle 200 and communicates the rider's selected options to the corresponding ECU 205 and/or the VCU 210. In some cases, the infotainment unit 220 may present vehicle functionality profile selection options and/or ride preference selection options to the rider via a center console display and communicate the selected vehicle functionality profile to the VCU 210. In an embodiment, a user device (e.g., the user device 110) may be utilized in place of or in addition to the infotainment unit 220, at least with regard to providing vehicle functionality profile selection options and/or ride preference selection options to the VCU 210. For example, the user device may communicate with the VCU 210 via the vehicle communication unit 215.

The vehicle communication unit 215 may manage communications between the vehicle 200 and network entities via a wired and/or wireless connection (e.g., an IEEE 802.11 wireless connection, a Bluetooth connection, a cable/DSL/satellite modem, a cell tower, etc.). Network entities may include a user profile manager, a vehicle profile manager, a ride hailer, a vehicle seller, a car manufacturer, a telecommunication service provider, an internet service provider, a media provider, and/or other entities that may utilize or provide the vehicle 200. In some examples, the vehicle communication unit 215 may be implemented as an array of communication platforms (e.g., Bluetooth modem, NFC reader, radio frequency (RF) communication array, 4G Long-Term Evolution (LTE), Global System for Mobile Communications (GSM) modem, etc.). The vehicle communication unit 215 may maintain network information (e.g., a network address, network settings, etc.) for sending and/or receiving data over various communication platforms using various communication protocols. The vehicle communication unit 215 may manage the connections between the vehicle 200 and outside entities (e.g., a Bluetooth connection between a user device and the VCU 210). In some examples, the vehicle communication unit 215 may establish communicative connections with different network entities (e.g., a car manufacturer, a telecommunication service provider, an internet service provider, a media provider, etc.) to send data from the vehicle 200 to the network entities and/or receive data from the network entities for delivery to the vehicle 200 (e.g., vehicle functionality profiles). In addition, the vehicle communication unit 215 may communicate with a computing device, such as a personal electronic device (e.g., a smartphone, a tablet, a smart watch, etc.), a personal computer (e.g., a desktop, a laptop, etc.), a diagnostic computer (e.g., at a dealership, etc.), etc. In some examples, one or more computing devices connected to the vehicle 200 via the vehicle communication unit 215 may transmit and receive information, such as vehicle diagnostic data, media files (e.g., movies, music, television programs, etc.) uploaded to a memory of the vehicle 200, firmware and/or software updates, vehicle functionality profiles, ride preferences, etc.

The VCU 210 may be implemented by any device accompanying software that accepts, processes, and/or transmits data within a vehicular information network (e.g., the data bus 225). The VCU 210 is in communication with other components of the vehicle 200, such as the ECUs 205, the vehicle communication unit 215, and the infotainment unit 220, via the data bus 225. In FIG. 2, the VCU 210 acts as the controller of the ECUs 205 in the vehicle 200. In some cases, the VCU 210 can instruct and/or alter the operating parameters of the ECUs 205 of the vehicle 200, such as in accordance with a vehicle functionality profile provided by the user to the vehicle 200.

In some cases, the VCU 210 may receive vehicle functionality profiles via the vehicle communication unit 215. For example, the VCU 210 may store vehicle functionality profiles or may have access to vehicle functionality profiles stored in the vehicle 200. The vehicle functionality profiles stored in the vehicle 200 may include those that can be applied to (e.g., are compatible with) the vehicle 200. In some cases, the vehicle functionality profiles stored in the vehicle 200 may include those that cannot be applied to (e.g., are not compatible with) the vehicle 200 (e.g., with an indication of the lack of compatibility with the vehicle functionality profiles also stored in the vehicle 200). The vehicle functionality profiles that can be applied to the vehicle 200 may be determined as part of manufacturing the vehicle 200 or post-manufacturing.

For example, the VCU 210 may be in communication with (e.g., via the vehicle communication unit 215) a server (e.g., the vehicle functionality profile management system 125) storing vehicle functionality profiles. Data describing available vehicle functionality profiles at the server may be collected by the VCU 210. Such data may be presented via a display of the infotainment unit 220 and/or a user device. The user device may have stored vehicle functionality profiles of the vehicle 200 via a mobile application in communication with a server (e.g., the vehicle functionality profile management system 125) storing the vehicle functionality profiles. The vehicle functionality profile selected via the infotainment unit 220 or the user device may be transmitted to the VCU 210. In some cases, such as when the vehicle functionality profile is provided by the user device, the VCU 210 may access data stored in the vehicle 200 and, if needed, access the server (e.g., the vehicle functionality profile management system 125) to determine whether the vehicle functionality profile can be applied to the vehicle 200. For example, the vehicle 200 may access the server via a mobile application installed in the vehicle 200. In this regard, the VCU 210 may determine if a selected vehicle operation profile is stored locally and, if the selected vehicle functionality profile is not stored locally, the VCU 210 may request and/or obtain the selected vehicle functionality profile from the remote server. In some examples, the vehicle functionality profiles may be obtained as an e-commerce transaction. In other examples, the vehicle functionality profiles may be obtainable from the remote server in a subscription based service.

The VCU 210 applies changes to operating parameters of corresponding ECUs 205 based on the vehicle functionality profiles, such as when transitioning from applying one vehicle functionality profile to the vehicle 200 to applying another vehicle functionality profile to the vehicle 200. Each transition may be associated with a different operation of the vehicle 200. For example, a first vehicle functionality profile may be applied to a first operation of the vehicle 200. To switch to a second vehicle functionality profile, the first vehicle functionality profile may be removed from the first operation of the vehicle 200 and the second vehicle functionality profile may be applied to a second operation of the vehicle. When the instructions have been executed to change the operating parameters of the vehicle 200 according to the newly applied vehicle functionality profile, the vehicle 200 may have a different level of performance and/or feel experienced by a rider (e.g., driver, passenger) of the vehicle 200 when the vehicle 200 is operated (e.g., driven). In some cases, when the vehicle functionality profile has been successfully applied, the vehicle 200 may indicate to the user that the vehicle functionality profile has been successfully applied. For example, the vehicle 200 may display a textual and/or pictorial indication on a console display provided in the vehicle 200 and/or transmit the textual and/or pictorial indication to the user's device (e.g., for display by the user's device).

In the illustrated example of FIG. 2, the vehicle 200 includes a body 230, wheels 235, a seat 240, a motor 245, a cooling system 250, and a transmission 255. The body 230 covers an exterior of the vehicle 200 to protect and/or contain the other parts of the vehicle 200. In one example, the ECU 205A controls braking systems, ECU 205B controls the cooling system 250, and ECU 205C controls the transmission system. The motor 245 may be implemented by a combustion engine, a direct current (DC) electric motor, and/or an alternating current (AC) electric motor. The motor 245 may be communicatively coupled to the ECU 205D and the transmission 255. The ECU 205D may receive operating power from batteries 260 to control components of the motor 245 (e.g., throttle valve, sparkplugs, pistons, fuel injectors, etc.). The ECU 205D may receive signals from a driver (e.g., via sensors in a pedal, etc.) to determine corresponding control signals to communicate to the motor 245 (e.g., manipulating throttle valve, firing spark plugs, altering fuel injection quantities, etc.). The motor 245 may supply torque to the transmission 255 to drive two or more wheels 235.

Figure 3:
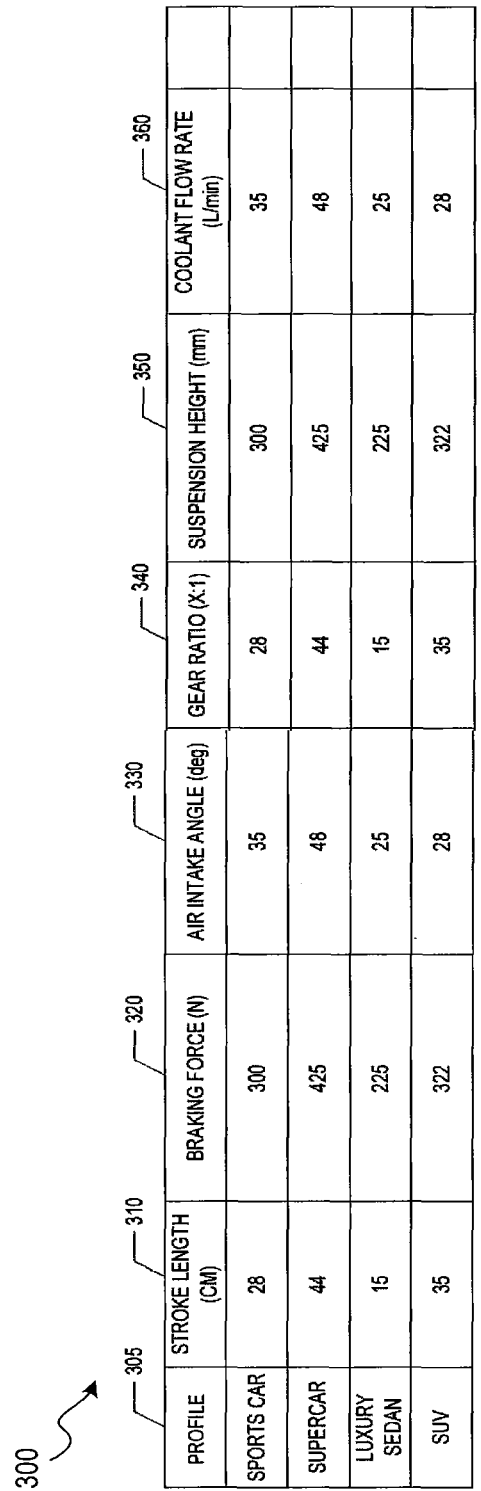
FIG. 3 illustrates an example of a table of vehicle functionality profiles in accordance with one or more embodiments of the present disclosure.

FIG. 3 illustrates an example of a table 300 of vehicle functionality profiles 305 in accordance with one or more embodiments of the present disclosure. In an embodiment, the vehicle 200 may utilize the table 300. The table 300 may be stored in a user device (e.g., 110), the vehicle 200 (e.g., the VCU 210), a vehicle functionality profile management system (e.g., 125), and/or other device. Each of the vehicle functionality profiles 305 includes values for each of a plurality of operating parameters. To change from one vehicle functionality profile to another vehicle functionality profile, the VCU 210 may communicate instructions to corresponding ECUs to alter a mechanical or electrical component of the vehicle 200 according to values for corresponding operating parameters. The vehicle functionality profiles 305 include operating parameters such as a stroke length 310, a braking force 320, an air intake angle 330, a gear ratio 340, a suspension height 350, and a coolant flow rate 360.

With reference back to the table 300, the stroke length 310 operating parameter may direct a corresponding ECU 205 to adjust the distance in which the pistons in the engine of the vehicle 200 travel during a stroke (e.g., a reciprocating motion cycle). For example, the VCU 210 may transmit instructions to an appropriate ECU (e.g., ECU that controls the engine of the vehicle 200) to change the mechanical seating of the piston on the crankshaft to effectuate the desired travel distance (e.g., stroke length) of the piston. The braking force 320 operating parameter may control the force (e.g., in newtons) with which a corresponding ECU 205 directs the brake calipers to apply to the wheel discs on the vehicle 200. The air intake angle 330 operating parameter may direct a corresponding ECU 205 to limit an angle of the manifold device of the engine of the vehicle 200. The gear ratio 340 operating parameter may direct the corresponding ECU 205 to adjust the gear ratio of the transmission of the vehicle 200 (e.g., adjusting a continuously variable transmission gear box). The suspension height 350 operating parameter may direct a corresponding ECU 205 to adjust the suspension height to a certain height from the top of the wheels. For example, the corresponding ECU 205 may use hydraulic and or air compression systems to raise or lower the body of the vehicle 200 to the desired height. The coolant flow rate 360 operating parameter may direct a corresponding ECU 205 to adjust the coolant pump of the vehicle 200 to achieve a target flow rate in liters per minute.

Each operating parameter is representative of the behavior of each vehicle type represented in the vehicle functionality profiles 305. For example, the sports car and supercar have operating parameters that, when implemented, achieve a fast, technical level of performance while operating the vehicle 200. The example luxury sedan and SUV vehicle functionality profiles have operating parameters that, when implemented, achieve a smooth and/or comfortable level of performance. Thus, by implementing one of the vehicle functionality profiles 305, the vehicle 200 may emulate the level of performance of the implemented vehicle functionality profile. For example, using the sports car vehicle functionality profile, the vehicle 200 will operate like, and achieve the levels of performance of, a sports car.

It will be appreciated that the vehicle functionality profiles 305 and operating parameters 310, 320, 330, 340, 350, and 360 shown in the table 300 of FIG. 3 may be a sample of vehicle functionality profiles and operating parameters. A table of vehicle functionality profiles may have more, fewer, and/or different vehicle functionality profiles and/or operating parameters than those provided in the table 300. In some cases, the vehicle functionality profiles may be associated with particular known makes and models of vehicles.

In some embodiments, operating parameters of the vehicle 200 may be associated with safety margins within which the values of the operating parameters may be set while maintaining performance and safety. In some aspects, the safety margins may be provided as part of the certification of the hardware platform utilized by the vehicle 200 to control operation of the vehicle 200. In some cases, since the various operating parameters may be dependent on one another, an adjustment in value of one operating parameter may affect the safety margins associated with one or more of the remaining operating parameters.

In some embodiments, the vehicle 200 applies a vehicle functionality profile without adjustment to any operating parameters defined in the vehicle functionality profile. In some aspects, the vehicle 200 and the user are unable to adjust the vehicle functionality profile. In other embodiments, adjustment of operating parameters of a vehicle functionality profile may be allowed. In such embodiments, operating parameters of a vehicle functionality profile may be adjusted to obtain an adjusted version of the vehicle functionality profile. The VCU 210 may analyze and validate the adjusted version of the vehicle functionality profile for performance and safety. For example, in some cases, the adjustment of a vehicle functionality profile may be allowed by a captain of a vehicle, the vehicle, a provider of the vehicle functionality profile, a provider of a vehicle renting service, a vehicle administrator, and/or a certifier of the vehicle functionality profile.

The set of operating parameters of the adjusted version may be validated against a set of rules and operating parameter ranges defining operation of the vehicle. The set of rules may be, or may be based on, safety margins associated with the operating parameters. For example, the safety margin may provide minimum and maximum values for various operating parameters of the vehicle. In some cases, the minimum and maximum values may be compiled as part of a certification process of the hardware platform of the vehicle 200. Rules and operating parameters may be part of manufacturing/testing of the hardware platform of the vehicle 200. In this regard, the hardware platform of the vehicle 200 may be associated with safe operating parameter ranges and may validate incoming vehicle functionality profiles against such safe operating parameter range for safety. In an aspect, a first subset of operating parameters that conform to the set of rules and/or operating parameter ranges may be marked as valid, and a second subset of operating parameters in the vehicle functionality profile may be marked as invalid when the second subset does not conform to the set of rules and/or operating parameter ranges defining operation of the vehicle. If the combination of the operating parameters of the first subset does not end up creating an unsafe condition for the rider(s), instructions corresponding to the operating parameters of the first subset may be transmitted to corresponding ECUs.

With reference to FIGS. 2 and 3, when new values for various operating parameters are validated, the VCU 210 may generate instructions to change current values of the operating parameter for the vehicle 200 so long as the vehicle 200 remains safe to operate upon application of the changes to the operating parameters. In this regard, the VCU 210 may generate instructions for the ECU 205 that controls the operating parameter and transmit the instructions to the ECU 205. In some examples, failure to validate an operating parameter from a vehicle functionality profile may result in no change to the current operating parameter of the vehicle 200. In other examples, when an operating parameter from the new vehicle functionality profile exceeds a corresponding maximum operating parameter for the vehicle 200, instructions are generated by the VCU 210 to change the current operating parameter to the maximum allowable operating parameter provided that the vehicle 200 remains safe for the rider(s) upon the change in the operating parameter.

As such, in some aspects, operating parameters of vehicle functionality profiles may be validated against a set of rules (e.g., safety margins) that defines the operation of the existing systems of the vehicle 200. The validation may help ensure that changes made to existing operating parameters do not make the vehicle 200 unsafe to drive and that improper wear is not induced into the components of the vehicle 200 after the operating parameters are changed. For example, the engine air intake operating parameter may be validated so that an improper amount of air is not allowed into the engine (e.g., an improper amount may damage the engine). As a further example, the gear shift ratio operating parameter of a luxury sedan vehicle functionality profile (e.g., a Mercedes S550 vehicle functionality profile) may be validated against the capabilities of the gearbox of the vehicle 200 to ensure that the gearbox of the vehicle 200 can execute the luxury sedan gear shift ratio in the luxury sedan vehicle functionality profile. Improper gear shift ratios may cause damage to the engine and/or clutch of the vehicle 200 (e.g., through unnecessary heating). If the operating parameters are validated as safe against the safety values, they may be applied to the vehicle 200 to achieve the desired vehicle functionality profile (e.g., to achieve a performance emulation). In some cases, adjusted versions of vehicle functionality profiles may be validated as safe or determined to be unsafe and stored for future reference (e.g., in a user device, the vehicle 200, and/or the vehicle functionality profile management system 125). In some cases, validation may be performed on a combination of operating parameters, such as a combination of engine torque, brake capacity, and tire inflation, rather than validation on each operating parameter in isolation from other operating parameters.

In some aspects, vehicle functionality profiles of a vehicle may be set (e.g., by a captain) to be activated based on certain parameters (e.g., activation parameters) such as, for example, the detection of the presence of a certain user. For example, a vehicle may detect a smartphone associated with a captain and implement a favorite driving profile of the captain. Additional activation parameters may include geographic location. For example, a vehicle entering mountainous terrain may enable a stored SUV and/or all-wheel drive driving profile to better handle potential conditions. Another, activation parameter may be current driving conditions (e.g., traffic congestion data obtained from a navigation application in the infotainment system, current weather conditions at the location of the vehicle, road type according to the navigation application (e.g., highway, street, dirt road, etc.)). For example, detected weather may enable a stored SUV and/or all-wheel vehicle functionality profile to better handle potential conditions. Another example condition may be a grid-locked traffic. For example, the vehicle may transition to an economy sedan vehicle functionality profile to conserve fuel in a grid-lock. Another parameter may include vehicle status. For example, a certain vehicle functionality profile associated with past successful driving may be activated when problems are detected in the vehicle. Another activation parameter may be vehicle functionality profiles of other vehicles in the vicinity of the vehicle using the example vehicle control unit disclosed herein. For example, when a particular vehicle functionality profile is detected as enabled in a nearby vehicle, the vehicle control unit may enable that particular vehicle functionality profile in the vehicle.

Figure 4:
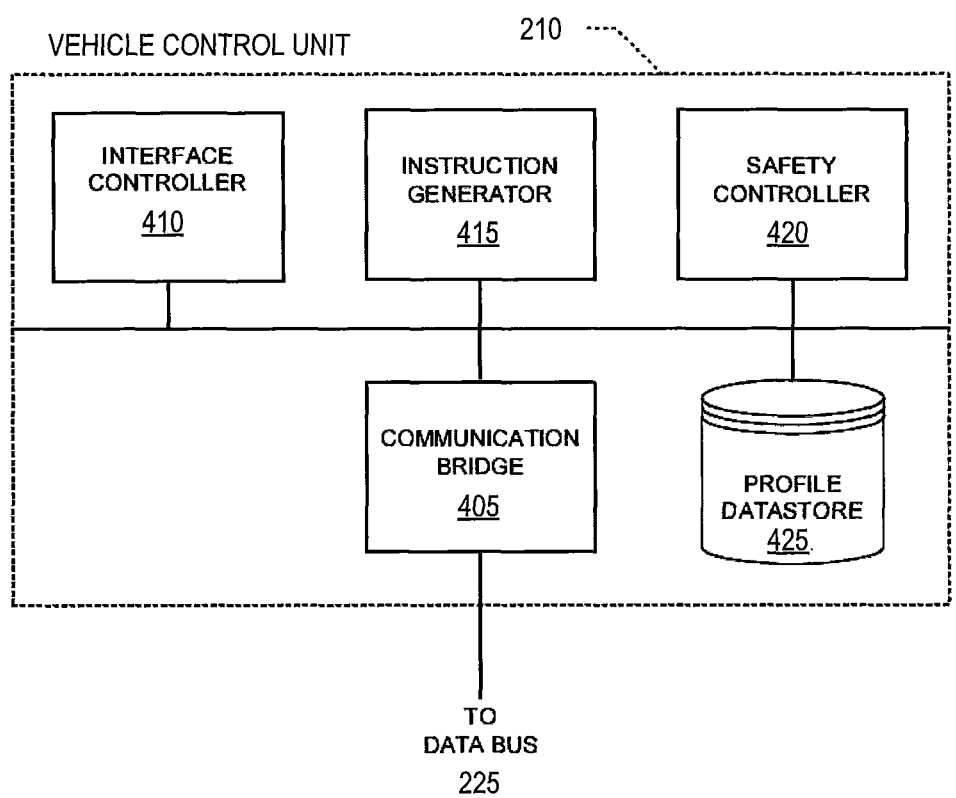
FIG. 4 is a block diagram of an example implementation of a vehicle control unit of the vehicle of FIG. 2 in accordance with one or more embodiments of the present disclosure.

FIG. 4 is a block diagram of an example implementation of the VCU 210 of FIG. 2 in accordance with one or more embodiments of the present disclosure. Not all of the depicted components may be required, however, and one or more embodiments may include additional components shown in the figure. Variations in the arrangement and type of the components may be made without departing from the spirit or scope of the claims as set forth herein. Additional components, different components, and/or fewer components may be provided.

The VCU 210 includes a communication bridge 405, an interface controller 410, an instruction generator 415, a safety controller 420, and a vehicle functionality profile data store 425. The communication bridge 405 may manage communication originating from or directed to the VCU 210. In an aspect, the communication bridge 405 may be utilized to apply changes to the vehicle functionality profile of the vehicle by transmitting the signals to alter the operating parameters of the ECUs in the vehicle 200. The communication bridge 405 may encode and decode messages between the VCU 210 and other components of the vehicle 200 (e.g., the ECUs 205, the vehicle communication unit 215, the infotainment unit 220, etc.) via the data bus 225. For example, the communication bridge 405 may manage messages of the VCU 210 to be sent to corresponding ECUs 205 based on changes dictated by a requested vehicle functionality profile. In some cases, the VCU 210 may leverage the communication bridge 405 to communicate with a remote device (e.g., a smartphone) and/or a remote server using the vehicle communication unit 215 to establish an external data connection (e.g., Wi-Fi, LTE, Bluetooth, NFC, etc.). In some cases, the communication bridge 405 may drive the vehicle communication unit 215 (e.g., powers the antenna in the radio frequency waveguide, drives the loop-inductor-antenna of the NFC system, etc.).

The interface controller 410 may detect requests to alter the vehicle functionality profile of the vehicle 200. In FIG. 4, the interface controller 410 is in communication with the communication bridge 405, instruction generator 415, safety controller 420, and vehicle functionality profile data store 425. For example, a request to alter the vehicle functionality profile of the vehicle 200 may be selected by a rider via interaction with the rider's smartphone (e.g., user device 110). The interface controller 410 may detect the request and the selected vehicle functionality profile (e.g., via a message communicated across the data bus 225 via the vehicle communication unit 215).

In some cases, when a request to change the vehicle functionality profile applied to the vehicle 200 is detected, the interface controller 410 may verify whether the requested vehicle functionality profile is stored locally (e.g., in the vehicle functionality profile data store 425). If the requested vehicle functionality profile is not stored locally, the interface controller 410 may generate a request to a remote device and/or server (e.g., the vehicle functionality profile management system 125) to obtain the requested vehicle functionality profile (e.g., via the communication bridge 405). In this regard, the interface controller 410 may generate a request to the remote device and/or server to obtain data associated with the requested vehicle functionality profile, such as values for operating parameters that define the vehicle functionality profile and/or an indication of whether the requested vehicle functionality profile may be applied to the vehicle 200. When obtained, the requested vehicle functionality profile may be stored in the vehicle functionality profile data store 425 (e.g., for current and future use) and verified as being stored locally.

When the vehicle functionality profile is verified as stored locally, the interface controller 410 may provide the requested vehicle functionality profile to the instruction generator 415. The instruction generator 415 may parse the obtained vehicle functionality profile into operating parameters and associated values. The instruction generator 415 may generate and transmit instructions to the ECUs 205 of the vehicle 200. The instructions may be executed by the ECUs 205 to cause the ECUs 205 to adjust values for their corresponding operating parameters of the vehicle 200. By enacting the changes to the operating parameters of the vehicle 200, the desired/requested vehicle functionality profile is applied to the vehicle 200.

In some cases, the instruction generator 415 may determine which of the ECUs 205 are associated with the parsed operating parameters to properly generate operating parameter change instructions. To that end, the instruction generator 415 may be provided with a table that lists the ECUs 205, the ECUs' instruction set language, and which operating parameters the ECUs 205 utilize/control. For example, gear shift timing, engine air intake angle, and coolant flow rate may be associated with the engine ECU, which may communicate in embedded C and/or any other suitable language. Braking response may be associated with another ECU communicating in VHDL and/or any other suitable language. Thus, by utilizing the table that lists the ECUs 205, the instruction generator 415 may generate properly coded instructions to each ECU 205 associated with each operating parameter such that proper adjustments are made in view of the requested vehicle functionality profile. For example, the engine air intake angle operating parameter may be adjusted through an embedded C command issued to the engine ECU by the instruction generator 415. In general, ECU application programming interfaces are known to the instruction generator 415 so that the instruction generator 415 can alter operating parameters.

In an embodiment, when a vehicle functionality profile may be adjusted (e.g., within confines of safety margins), the values for the operating parameters of the adjusted vehicle functionality profile may be provided to the safety controller 420 so that they may be validated. In one case, the adjusted values may be provided by a user device of a vehicle user. If the safety controller 420 verifies that the values for the operating parameters and combinations thereof are within the safety margins, the operating parameters may be transmitted back to the instruction generator 415. The instruction generator 415 may generate and transmit instructions for the ECUs 205 based on the adjusted values of the operating parameters. In some cases, the adjusted vehicle functionality profile may be stored in vehicle functionality profile data store 425 for future use.

If the safety controller 420 determines that one or more values of the operating parameters are outside the safety margin, and/or a combination of the values may be unsafe, the safety controller 420 may transmit an indication to the instruction generator 415 to not create and/or transmit instructions to the ECUs 205. In one example, the safety controller 420 may communicate with the user device via the communication bridge 405, data bus 225, and vehicle communication unit 215 to indicate the error, request the user to authorize the vehicle 200 to use the vehicle functionality profile without adjustment or request the user to select another vehicle functionality profile, and/or request different values for the operating parameters. In other examples, the safety controller 420 may adjust, or inform the instruction generator 415 to adjust, the values of the operating parameters to conform to safe values based on the safety margins. The vehicle functionality profile data store 425 may store vehicle functionality profiles. The vehicle functionality profiles may be acquired remotely via the communication bridge 405, such as from the vehicle functionality profile management system 125.

Figure 5:
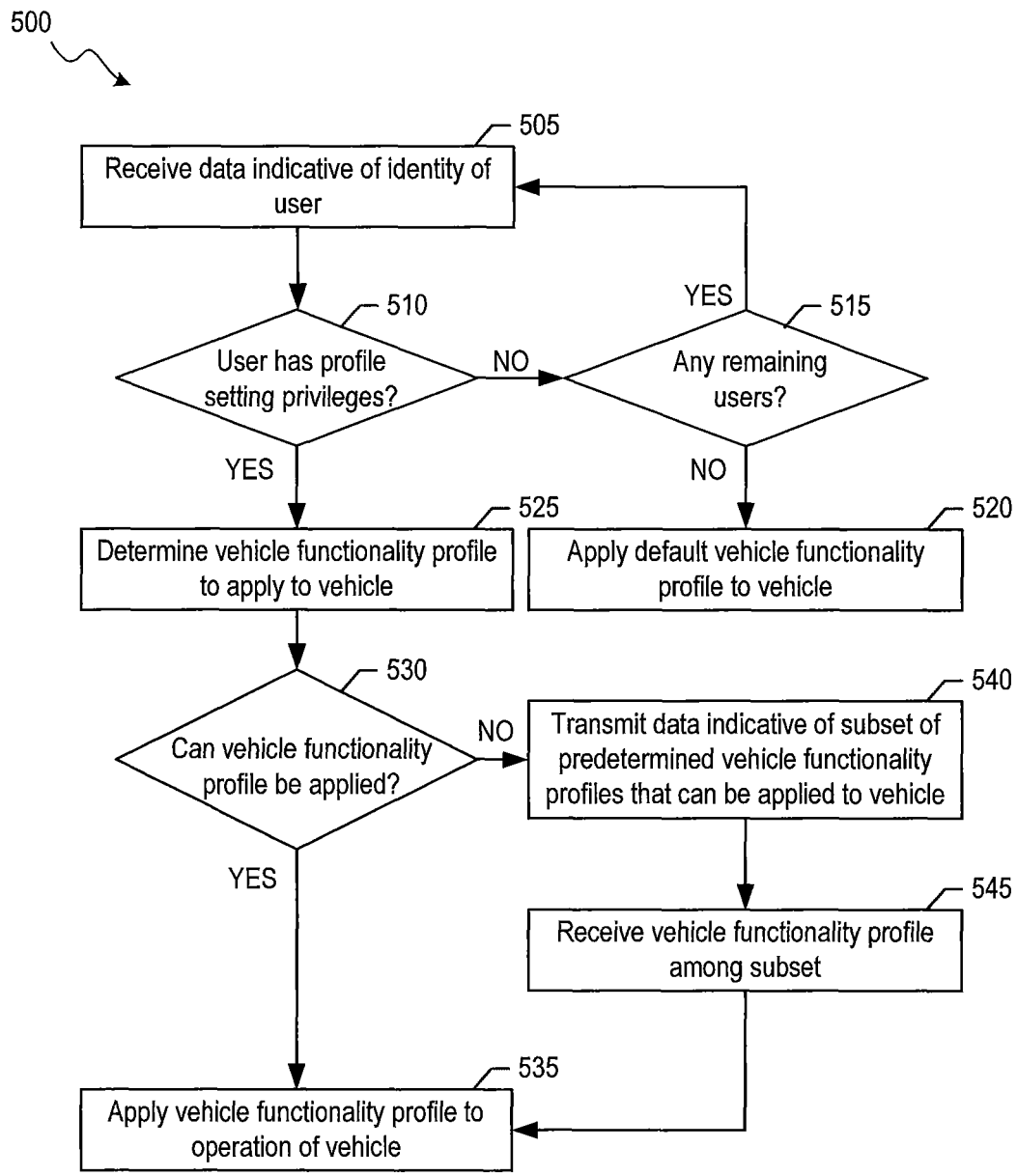
FIG. 5 illustrates a flow diagram of an example of a process for facilitating application and portability of vehicle functionality profiles and vehicle ride preferences in accordance with one or more embodiments of the present disclosure.

FIG. 5 illustrates a flow diagram of an example of a process 500 for facilitating application and portability of vehicle functionality profiles and vehicle ride preferences in accordance with one or more embodiments of the present disclosure. For explanatory purposes, the process 500 is described herein with reference to the example network environments 100A-D of FIGS. 1A-1D; however, the process 500 is not limited to the example network environments 100A-D of FIGS. 1A-1D. Note that one or more operations may be combined, omitted, and/or performed in a different order as desired.

At block 505, the vehicle 105 receives data indicative of an identity of a user of the vehicle 105. The vehicle 105 may receive the data indicative of the identity from the user device 110 of the user, such as via a wired or wireless connection between the vehicle 105 and the user device 110. In some cases, an application (e.g., app) associated with (e.g., running on) the vehicle 105 may receive the data indicative of the identity from an application associated with (e.g., running on) the user device 110. The vehicle 105 and the user device 110 may have corresponding applications installed to facilitate applying of a vehicle functionality profile to the vehicle 105.

For example, the vehicle 105 may receive the data from the user device 110 as part of a handshake procedure. The handshake procedure may be initiated (e.g., by the vehicle 105 or user device 110) in accordance with settings provided for the vehicle 105 or the user device 110. The identity of the user may be an account username, an actual name, a contact information, biometrics, and/or generally any other information that identifies the user (e.g., to the application installed on the vehicle 105). In some cases, the user may ride the vehicle 105. In other cases, the user does not ride the vehicle 105. For example, the user may rent the vehicle 105 for use by others. As another example, the user may rent the vehicle 105 to transport a payload and not have any riders.

At block 510, the vehicle 105 determines whether the user has profile setting privileges based on the identity of the user. In some cases, the application associated with the vehicle 105 may determine whether the user has profile setting privileges. If the user does not have profile setting privileges, the process 500 proceeds to block 515. At block 515, the vehicle 105 determines whether there are any remaining users (e.g., users within a threshold distance of the vehicle 105). If there are no more users (e.g., no users have operation setting privileges), the process 500 proceeds to block 520. At block 520, the vehicle 105 applies a default vehicle functionality profile to an operation of the vehicle 105. In some cases, the default vehicle functionality profile may have previously been set by a manufacturer of the vehicle 105, an administrator of the vehicle 105, or a captain of the vehicle 105. In one case, the vehicle 105 may receive ride preferences from one or more users of the vehicle 105. In this case, the vehicle 105 may apply the default vehicle functionality profile and apply (e.g., accommodate) the ride preferences to the operation of the vehicle 105. If there are remaining users, the process 500 proceeds to block 505, in which the vehicle 105 receives data indicative of an identity of another user.

If the user has profile setting privileges, the process 500 proceeds to block 525. At block 525, the vehicle 105 determines the vehicle functionality profile associated with the user to apply to an operation of the vehicle 105. The vehicle functionality profile may adjust current operating parameters of the vehicle 105. For example, the vehicle 105 is in a parked mode when the vehicle functionality profile is applied to the vehicle 105 to adjust the current operating parameters of the vehicle 105. In some aspects, the vehicle functionality profile may be one of a plurality of predetermined vehicle functionality profiles (e.g., stored on the vehicle functionality profile management system 125) selectable by the user. In an aspect, the application associated with the vehicle 105 may determine the vehicle functionality profile to apply to an operation of the vehicle 105. In one case, the vehicle 105 may receive the vehicle functionality profile from the user device 110 of the user. In another case, the vehicle 105 may retrieve the vehicle functionality profile associated with the user. For example, such information may be retrieved from memory of the vehicle 105 and/or the user profile management system 120. In an aspect, the vehicle 105 may determine ride preferences associated with the user by receiving them from the user device 110 and/or obtaining them from memory of the vehicle 105 and/or user profile management system 120. In one example, the ride preferences may be obtained along with the vehicle functionality profile or as separate communications. In some cases, the ride preferences may be tightly coupled with the vehicle functionality profile, such as to facilitate providing of a feel and performance of a particular known make or model.

At block 530, the vehicle 105 determines whether the vehicle functionality profile can be applied to (e.g., is compatible with) the vehicle 105. In an aspect, the application associated with the vehicle 105 may determine whether the vehicle functionality profile can be applied to (e.g., is compatible with) the vehicle 105. In some cases, the vehicle 105 may be certified as being compatible with at least a subset of the plurality of predetermined vehicle functionality profiles. If the vehicle 105 determines that the vehicle functionality profile can be applied to the vehicle 105, the process 500 proceeds to block 535. At block 535, the vehicle 105 applies the vehicle functionality profile to an operation of the vehicle 105. To apply the vehicle functionality profile, control signals may be provided to ECUs of the vehicle 105 to effectuate appropriate control of operating parameter values (e.g., stoke length, suspension height, etc.) that define the vehicle functionality profile. The vehicle 105 may also apply the ride preferences of the user. In some cases, ride preferences for multiple users of the vehicle 105 may be obtained by the vehicle 105 and applied to the vehicle 105. In this regard, while the vehicle 105 may apply the vehicle functionality profile of a captain, ride preferences may be provided by the captain and/or other users of the vehicle 105.

If the vehicle 105 determines that the vehicle functionality profile cannot be applied to the vehicle 105, the process 500 proceeds to block 540. At block 540, the vehicle 105 transmits, to the user device 110, data indicative of a subset of the predetermined vehicle functionality profiles that can be applied to the vehicle 105. For example, the user device 110 may display the subset of the vehicle functionality profiles on a display of the user device 110 to facilitate selection of a compatible vehicle functionality profile by the user. At block 545, the vehicle 105 receives a vehicle functionality profile selection among the subset from the user device 110. At block 535, the vehicle 105 applies the vehicle functionality profile among the subset.

In some aspects, the user of the user device 110 may transfer vehicle profile setting privileges to another user. For example, the application associated with the vehicle 105 may receive from the application associated with the user device 110 an indication to transfer vehicle profile setting privileges to another user. The application associated with the vehicle 105 may then receive a vehicle functionality profile from a user device of this other user (e.g., receive from an application associated with this other user's device) and determine whether the vehicle functionality profile can be applied to the vehicle 105.

Although the process 500 describes an embodiment in which a single user has profile setting privileges, in some embodiments, multiple users can have profile setting privileges. In these embodiments, each user may be associated with a different priority value. The vehicle 105 may identify the user that is associated with a highest priority value and determine the vehicle functionality profile of this identified user.

In another embodiment, if the vehicle 105 determines that no users in proximity of (e.g., within or within a predetermined distance to) the vehicle 105 have profile setting privileges, such as in a case no captain(s) rides the vehicle 105, a captain(s) of the vehicle 105 may provide a setting that allows users (e.g., non-captains) of the vehicle 105 to provide their vehicle functionality profiles in one or more specified manners. For example, the vehicle 105 may be set to allow any users with appropriate hardware and/or software (e.g., appropriate application installed on user device and/or appropriate subscription to service) to provide their vehicle functionality profile in the specified manner(s). As a particular example, a specified manner may be for a user to provide the user's device in proximity (e.g., with communication range) to an NFC chip in the vehicle 105 to allow, communication of appropriate data (e.g., user's identity, vehicle functionality profile, and/or ride preferences) to the vehicle 105.

As described in the foregoing, the vehicle 105 performs the process 500 in some embodiments. In other embodiments, with reference to the network environment 100D of FIG. 1D, the vehicle management system 150 may perform the process 500. In some cases, the vehicle management system 150 may host a website to facilitate buying, selling, renting, and/or sharing of vehicles. In these cases, as an example, the vehicle management system 150 may provide a listing of vehicles and vehicle functionality profiles compatible with each vehicle. The vehicle management system 150 may receive a user's identity (e.g., block 505) when the user logs into the website. The vehicle management system 150 may determine vehicle functionality profile of the user (e.g., block 525), such as based on user selection of a vehicle functionality profile or based on information previously provided by the user (e.g., stored as part of the user's profile for the user's website account). In some cases, the user may store the same or different vehicle functionality profile on the user device 110, user profile management system 120, and/or vehicle management system 150, such that the user does not need to manually provide the vehicle functionality profile each time the user uses a service provided by the vehicle management system 150. The vehicle management system 150 may apply the vehicle functionality profile to operate an appropriate vehicle (e.g., block 535) by transmitting instructions to the vehicle that, when executed by the vehicle, causes the vehicle to apply the vehicle functionality profile. In some cases, the vehicle provided to the user may be selected by the user. In other cases, the vehicle provided to the user may be selected by the vehicle management system 150 (e.g., based on vehicle functionality profile, ride preferences, cost preferences, and/or other preferences provided by the user). In some aspects, the vehicle 105, the user device 110, and the vehicle management system 150 may have applications installed and running thereon to facilitate selecting and/or applying of a vehicle functionality profile for an operation of the vehicle 105.

Figure 6:
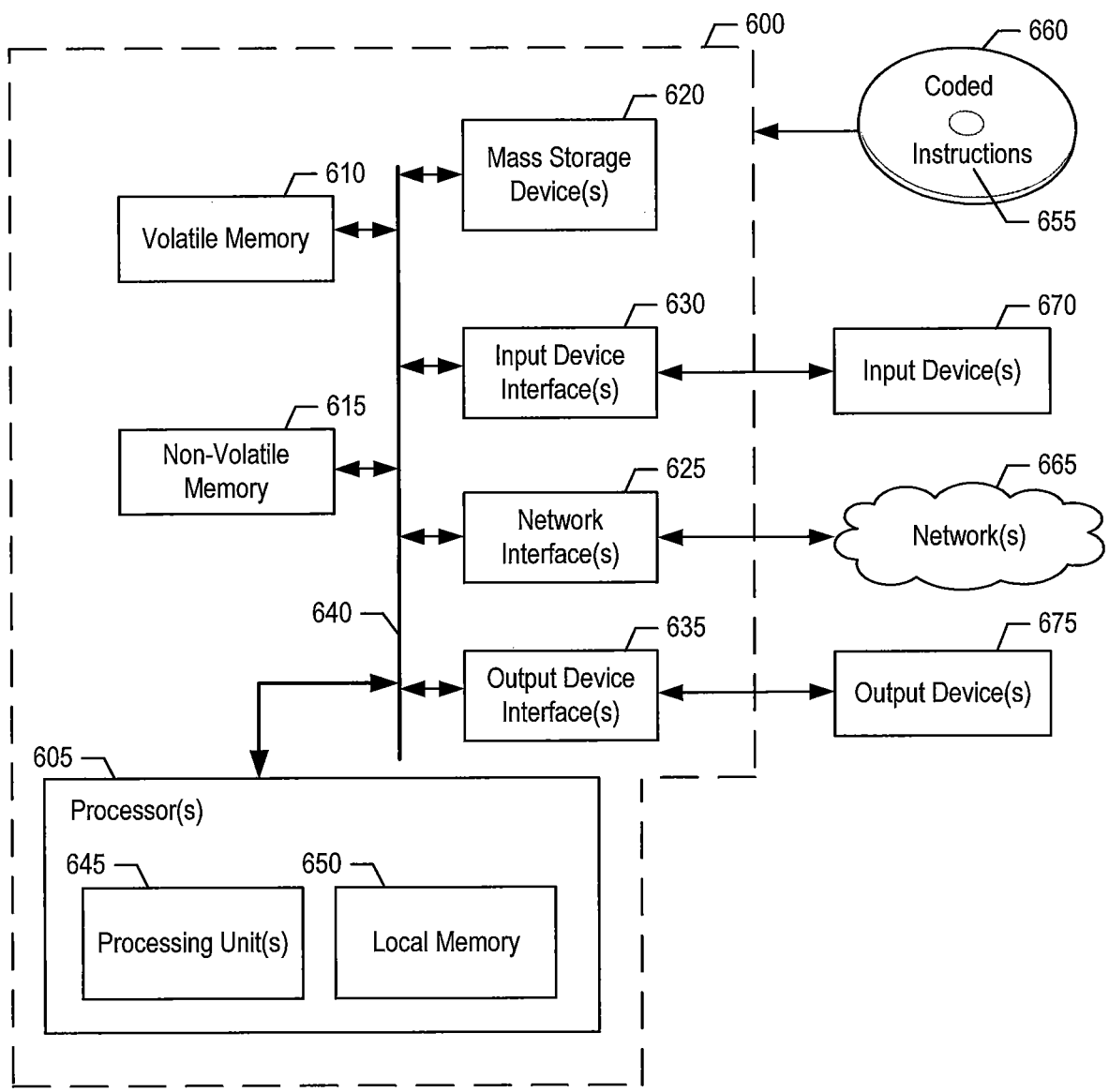
FIG. 6 illustrates a block diagram of an example of an electronic system with which one or more embodiments of the present disclosure may be implemented.

FIG. 6 illustrates a block diagram of an example of an electronic system 600 with which one or more embodiments of the present disclosure may be implemented. In an embodiment, the electronic system 600 may be, may include, or may be referred to as, processor platform. The electronic system 600 can generally be any type of computing device. In an embodiment, the electronic system 600 can be, can include, and/or can be a part of, one or more of the vehicle 105, user device 110, network 115 (e.g., access points of the network 115), user profile management system 120, vehicle functionality profile management system 125, vehicle 130, user device 135, vehicle 140, user device 145, vehicle management system 150, and vehicle 200 shown in FIGS. 1A-1D and 2, and/or components thereof (e.g., VCU 210). For example, the electronic system 600 may be, may include, or may be a part of, the vehicle 105.

The electronic system 600 includes one or more processors 605, volatile memory 610, non-volatile memory 615, one or more mass storage devices 620, one or more network interfaces 625, one or more input device interfaces 630, one or more output device interfaces 635, and a link 640. The link 640 may be, may include, or may be implemented by, a bus, one or more point-to-point connections (e.g., intra-chip connections and/or inter-chip connections), and/or other connections for facilitating connection of and/or communication between various components of the electronic system 600.

The link 640 couples (e.g., connects) to the processor(s) 605. In an aspect, the processor(s) 605 of the illustrated example is hardware. For example, the processor(s) 605 can be implemented by one or more integrated circuits, logic circuits, processors, and/or controllers from any desired family or manufacturer. The processor(s) 605 includes one or more processing units 645 configured via instructions 655 stored in a local memory 650 (e.g., a cache) of the processor(s) 605. In an aspect, the instructions 655 may include instructions that when executed, perform at least some instructions of FIG. 5. The processor(s) 605 is in communication with the volatile memory 610, non-volatile memory 615, and the mass storage device(s) 620 via the link 640.

The link 640 couples (e.g., connects) to the volatile memory 610, non-volatile memory 615, and mass storage device(s) 620. The volatile memory 610 may include synchronous dynamic RAM (SDRAM), dynamic RAM (DRAM), static RAM (SRAM) Rambus dynamic RAM (RDRAM), and/or other types of volatile memory. The non-volatile memory 615 may include read-only memory (ROM), programmable ROM (PROM), erasable programmable ROM (EPROM), electrically erasable programmable ROM (EEPROM), flash memory, non-volatile RAM (NVRAM), and/or other types of non-volatile memory. The non-volatile memory 615 may store instructions and data even when the electronic system 600 is off. The mass storage device(s) 620 may include floppy disk drives, hard disk drives, compact disk drives, DVD drives, Blu-ray Disc™ drives, redundant array of independent disks (RAID) systems, solid state memories, and/or other devices that allow storage. Access to the volatile memory 610, non-volatile memory 615, and mass storage device(s) 620 may be controlled by a memory controller (not shown). In an aspect, the coded instructions 655 corresponding to at least some instructions of FIG. 5 may be stored in the volatile memory 610, non-volatile memory 615, mass storage device(s) 620, local memory 650, and/or on a removable tangible computer readable storage medium, such as a disk 660 (e.g., CD, DVD, or Blu-ray Disc™).

The link 640 couples (e.g., connects) to the network interface(s) 625. The network interface(s) 625 may couple the electronic system 600 to one or more networks 665. In this manner, the electronic system 600 can be a part of a network of devices, such as a local area network (LAN), a WAN, or an Intranet, or a network of networks, such as the Internet. In an embodiment, the network interface(s) 625 may facilitate communication between the electronic system 600 and a cellular network, such as a cellular network that includes the network 115 of FIGS. 1A-1D. The network interface(s) 625 may be implemented by any type of interface standard, such as an Ethernet interface, a USB interface, a PCI express interface, a wireless network interface (e.g., a wireless LAN interface), a cellular network interface, an NFC interface, a Bluetooth interface, and/or other interfaces. For example, a cellular network interface may provide support for GSM-based cellular networks, LTE-based cellular networks, code division multiple access (CDMA)-based cellular networks, and/or other cellular networks. The network interface(s) 625 may include a communication device such as a transmitter, receiver, transceiver, modem, and/or network interface card to facilitate exchange of data with external machines (e.g., computing devices of any kind) via the network(s) 665.

The link 640 couples (e.g., connects) to the input device interface(s) 630. The input device interface(s) 630 may couple the electronic system 600 to one or more input devices 670. The input device(s) 670 may enable a user to provide (e.g., enter) data and commands to the electronic system 600. For example, the user may be an operator of the vehicle 105 when the electronic system 600 is disposed in the vehicle 105 or when the electronic system 600 is a control device (e.g., the user device 110) of the vehicle 105. The input device(s) 670 may include, for example, an audio sensor, a microphone, a camera (still or video), a voice recognition system, a keyboard (e.g., a physical or virtual keyboard), a cursor control device (e.g., a mouse), a touchscreen, and/or other devices for providing user input to the electronic system 600. Also, many systems, such as the electronic system 600, can allow a user to provide data and commands using physical gestures, such as, but not limited to, hand or body movements, facial expressions, and face recognition. In this regard, the user input may be received in any form, such as audio (e.g., speech), visual, and/or tactile. For example, in an aspect, to adjust a vehicle functionality profile applied to a vehicle (e.g., the vehicle 105), a user device (e.g., the user device 110) that is, includes, or is a part of the electronic system 600, the user may select a vehicle functionality profile via a mouse communicatively connected to the electronic system 600 via the input device interface(s) 630. The selection via a mouse click may be relayed to the processor(s) 605 via the input device interface(s) 630 and the link 640. The processor(s) 605 may process the selection into commands to adjust the vehicle functionality profile applied to the vehicle.

The link 640 couples (e.g., connects) to the output device interface(s) 635. The output device interface(s) 635 may couple the electronic system 600 to one or more output devices 675. The output device interface(s) 635 may include a graphics and/or audio driver card, graphics and/or audio driver chip, and/or graphics and/or audio driver processor. The output device(s) 675 may enable the electronic system 600 to provide output information to a user. The output device(s) 675 may include, for example, display devices (e.g., a light emitting diode (LED), an organic LED (OLED), a liquid crystal display (LCD)), audio devices (e.g., speakers), audiovisual devices (e.g., augmented reality (AR) devices, virtual reality (VR) devices), and/or other output devices. In this regard, the output information may provide feedback to the user in any form, such as visual feedback, auditory feedback, and/or tactile feedback. For example, in an aspect, a vehicle (e.g., the vehicle 105) that is, includes, or is a part of the electronic system 600 may provide operational characteristics, such as remaining battery power, remaining fuel level, remaining actions to be performed, current position, component health (e.g., engine health, battery health), to a display coupled to the vehicle (e.g., wired or wirelessly coupled) via the output device interface(s) 635 and viewable by the user.

In one or more embodiments, FIG. 5 illustrates example machine readable instructions for the vehicle 105 and/or the vehicle management system 150. In these examples, the machine readable instructions may include one or more programs for execution by one or more processors, such as the processor(s) 605 shown in the electronic system 600. The one or more programs, or portion(s) thereof, may be embodied in software stored on a tangible computer readable storage medium, such as a compact disk (CD), a floppy disk, a hard drive, a digital versatile disk (DVD), a Blu-ray Disc™, and/or other storage device/disk storing the software and/or firmware associated with the processor(s) 605, but the entire program or programs and/or portions thereof may alternatively be executed by a device other than the processor(s) 1005, and/or embodied in firmware or dedicated hardware (e.g., implemented by one or more analog and/or digital circuit, application specific integrated circuits (ASICs), programmable logic devices (PLDs), and/or field programmable logic devices (FPLDs), discrete logic, etc.). Further, although the example program(s) is described with reference to the flow diagram illustrated in FIG. 5, many other methods may be used. For example, with reference to the flow diagrams illustrated in FIG. 5, the order of execution of the blocks may be changed, and/or some of the blocks described may be changed, removed, combined, and/or subdivided into multiple blocks.

The example process 500 of FIG. 5 may be implemented using coded instructions (e.g., computer and/or machine readable instructions) stored on a tangible computer readable storage medium such as a hard disk drive, flash memory, ROM, RAM, CD, DVD, cache and/or any other storage device or storage disk in which information is stored for any duration (e.g., for extended time periods, permanently, for brief instances, for temporarily buffering, and/or for caching of the information). Alternatively or in addition, the example process 500 of FIG. 5 may be implemented using coded instructions (e.g., computer and/or machine readable instructions) stored on a non-transitory computer and/or machine readable medium such as a hard disk drive, flash memory, ROM, RAM, CD, DVD, cache and/or any other storage device or storage disk in which information is stored for any duration (e.g., for extended time periods, permanently, for brief instances, for temporarily buffering, and/or for caching of the information). As used herein, the terms "tangible computer readable storage medium" and "non-transitory computer readable medium" are expressly defined to include any type of computer readable storage device and/or storage disk and to exclude propagating signals and to exclude transmission media. As used herein, "tangible computer readable storage medium" and "tangible machine readable storage medium" are used interchangeably.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

To the extent the above specification describes example components and functions with reference to particular standards and protocols, it is understood that the scope of the present disclosure is not limited to such standards and protocols. For instance, each of the standards for Internet and other packet switched network transmission (e.g., Transmission Control Protocol (TCP)/Internet Protocol (IP), User Datagram Protocol (UDP)/IP, Hypertext Markup Language (HTML), Hypertext Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by the present disclosure and are intended to be included within the scope of the accompanying claims.

Additionally, although embodiments of the present disclosure provide example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the foregoing provides example systems, methods, and articles of manufacture, the examples are not the only way to implement such systems, methods, and articles of manufacture. Therefore, although certain example methods, apparatus, and articles of manufacture have been described herein, the scope of coverage of the present disclosure is not limited thereto. On the contrary, the present disclosure covers all methods, apparatus, and articles of manufacture fairly falling within the scope of the claims either literally or under the doctrine of equivalents.

What is claimed is:

1. A method comprising:
receiving, by a first application associated with a vehicle from a second application associated with a first user device, data indicative of an identity of a first user;
determining, by the first application based on the identity, that the first user has vehicle profile setting privileges for the vehicle;
receiving, by the first application, a first vehicle profile associated with the first user to apply to the vehicle to adjust an operating parameter of the vehicle, wherein the first vehicle profile is one of a group of predetermined vehicle profiles selectable by the first user;
determining, by the first application, whether the first vehicle profile can be applied to the vehicle;
in response to determining the first vehicle profile can be applied to the vehicle, facilitating, by the first application, applying, by the vehicle, the first vehicle profile to the vehicle that causes a first operation of the vehicle; and
in response to determining that the first vehicle profile is unable to be applied to the vehicle:
facilitating, by the first application, transmitting, by the vehicle to the first user device, data indicative of a subset of the group of predetermined vehicle profiles that is able to be applied to the vehicle;
facilitating, by the first application, receiving, by the vehicle from the first user device, a vehicle profile selection among the subset to apply to the vehicle that causes the first operation of the vehicle; and
facilitating, by the first application, applying, by the vehicle, the vehicle profile selection from the subset to the vehicle.

2. The method of claim 1, further comprising:
receiving, by the first application from the second application, an indication to transfer the vehicle profile setting privileges to a second user;
receiving, by the first application from a second user device of the second user, a second vehicle profile to apply to the vehicle, wherein the second vehicle profile is one of the group of predetermined vehicle profiles and different from the first vehicle profile;
determining, by the first application, that the second vehicle profile can be applied to the vehicle; and
facilitating, by the first application, applying, by the vehicle, the second vehicle profile to the vehicle that causes a second operation of the vehicle.

3. The method of claim 2, further comprising:
facilitating, by the first application, receiving, by the vehicle from the first user device, first ride preference data representative of a first ride preference associated with the first user; and
facilitating, by the first application, receiving, by the vehicle from the second user device, second ride preference data representative of a second ride preference associated with the second user, wherein the second operation of the vehicle is based on the second vehicle profile, the first ride preference, and the second ride preference.

4. The method of claim 3, further comprising:
facilitating, by the first application, determining, by the vehicle, a distance between the second user device and the vehicle;
facilitating, by the first application, removing, by the vehicle, the second vehicle profile from the second operation of the vehicle; and
facilitating, by the first application, applying, by the vehicle, the first vehicle profile to the vehicle that causes a third operation of the vehicle.

5. The method of claim 1, further comprising:
facilitating, by the first application, determining, by the vehicle, a distance between the first user device and the vehicle; and
facilitating, by the first application, transmitting, by the vehicle to the first user device, a request for the data indicative of the identity of the first user when the distance is within a threshold,
facilitating, by the first application, wherein the data indicative of the identity is received from the first user device subsequent to transmitting the request.

6. The method of claim 1, further comprising facilitating, by the first application, transmitting, by the vehicle, a request to a server for a vehicle profile associated with the first user, wherein the first vehicle profile is received from the server subsequent to transmitting the request.

7. The method of claim 1, wherein applying the first vehicle profile comprises:
determining a value for an operating parameter associated with the first vehicle profile; and
configuring an electronic control unit of the vehicle based on the value for the operating parameter.

8. Vehicular equipment of a vehicle, comprising:
a processor; and
a memory that stores executable instructions that, when executed by the processor, facilitate performance of operations comprising:
detecting a first user equipment associated with a first user identity is within a defined distance of the vehicle;
determining that the first user identity is associated with a vehicle profile setting privilege for the vehicle;
receiving, from the first user equipment device, a first vehicle profile to apply to the vehicle to adjust an operating parameter of the vehicle, wherein the first vehicle profile is one selected from a group of stored vehicle profiles;
determining whether the first vehicle profile is applicable to the vehicle;
in response to determining that the first vehicle profile is applicable to the vehicle, applying the first vehicle profile to the vehicle that causes a first operation of the vehicle; and
in response to determining the first vehicle profile is not applicable to the vehicle:
transmitting, by the vehicular equipment to the first user equipment, data indicative of a subgroup of the group of stored vehicle profiles that are applicable to the vehicle;
receiving, by the vehicular equipment from the first user equipment, a selected vehicle profile among the subgroup to apply to the vehicle; and
applying, by the vehicular equipment to the vehicle, the selected vehicle profile from the subgroup that causes the first operation of the vehicle.

9. The vehicular equipment of claim 8, wherein the operations further comprise:
receiving data indicative of a second user identity;
determining that the second user identity has the vehicle profile setting privilege; and
receiving, from a second user equipment associated with the second user identity, an indication to transfer the vehicle profile setting privilege to be associated with the first user identity,
wherein the determining that the first user identity has the vehicle profile setting privilege is based on the indication to transfer the vehicle profile setting privilege to be associated with the first user identity.

10. The vehicular equipment of claim 9, wherein the operations further comprise receiving, from the first user equipment, first ride preferences associated with the first user identity, and wherein the first operation of the vehicle is based on the first vehicle profile and the first ride preferences.

11. The vehicular equipment of claim 8, wherein the operations further comprise:
transmitting, to the first user equipment, a request for data indicative of the identity of the first user identity in response to the detecting.

12. The vehicular equipment of claim 8, further comprising a port configured to receive an electrical connection, wherein data indicative of the first user identity of the first user is received from the first user equipment via the electrical connection.

13. The vehicular equipment of claim 8, wherein data indicative of the first user identity is received from the first user equipment via near field communication.

14. The vehicular equipment of claim 8, wherein the operations further comprise, in response to determining that the first vehicle profile is not applicable to the vehicle:
determining whether the first user is associated with the subgroup of the group of stored vehicle profiles that are applicable to the vehicle; and
in response to the first user being determined not to be associated with any stored vehicle profile among the subgroup, applying a defined default vehicle profile to the vehicle that causes the first operation of the vehicle.

15. A non-transitory machine readable medium, comprising executable instructions that, when executed by a processor, facilitate performance of operations, comprising:
receiving data indicative of a first identity of a first user;
determining, based on the first identity of the first user, a first vehicle profile to apply to a vehicle to adjust a current operating parameter of the vehicle, wherein the first vehicle profile is one of different vehicle profiles;
receiving, from a user device associated with a second identity of a second user, an indication to transfer a vehicle profile setting privilege to the first identity of the first user;
receiving a first ride preference associated with the first identity;
receiving a second f ride preference associated with the second identity;
determining whether the vehicle is configurable based on the first vehicle profile; and
in response to determining that the vehicle is configurable based on the first vehicle profile, applying the first vehicle profile to the vehicle that causes a first operation of the vehicle, wherein the first operation of the vehicle is based on the first vehicle profile, the first ride preference, and the second ride preference.

16. The non-transitory machine readable medium of claim 15, wherein determining the first vehicle profile comprises obtaining, from a server, the first vehicle profile associated with the first identity.

17. The non-transitory machine readable medium of claim 15, wherein the applying comprises transmitting the first vehicle profile to the vehicle to cause the vehicle to apply the first vehicle profile to adjust the operating parameter of the vehicle.

18. The non-transitory machine readable medium of claim 15, wherein the operations further comprise:
  determining, by the vehicle, a distance between a first user device associated with the first identity and the vehicle; and
  transmitting, by the vehicle to the first user device, a request for the data indicative of the first user identity when the distance is within a threshold, wherein the data indicative of the first user identity is received from the first user device subsequent to transmitting the request.

19. The non-transitory machine readable medium of claim 15, wherein the operations further comprise:
  receiving data indicative of the second identity of the second user;
  determining that the second identity has a vehicle profile setting privilege based on the second identity; and
  receiving, from a second user device associated with the second identity, an indication to transfer the vehicle profile setting privilege to the first identity.

20. The non-transitory machine readable medium of claim 15, wherein the operations further comprise receiving, from the first user device, a ride preference associated with the first identity, and wherein the first operation of the vehicle is based on the first vehicle profile and the ride preference.

* * * * *